United States Patent
Huo et al.

(10) Patent No.: US 11,638,015 B2
(45) Date of Patent: *Apr. 25, 2023

(54) METHODS FOR DETERMINING PREDICTION VALUE, ENCODER, AND DECODER

(71) Applicant: GUANGDONG OPPO MOBILE TELECOMMUNICATIONS CORP., LTD., Guangdong (CN)

(72) Inventors: Junyan Huo, Guangdong (CN); Yanzhuo Ma, Guangdong (CN); Shuai Wan, Guangdong (CN); Fuzheng Yang, Guangdong (CN); Wei Zhang, Guangdong (CN); Haixin Wang, Guangdong (CN); Yu Sun, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,121

(22) Filed: Oct. 29, 2021

(65) Prior Publication Data

US 2022/0053201 A1  Feb. 17, 2022

Related U.S. Application Data

(63) Continuation of application No. 17/325,752, filed on May 20, 2021, now Pat. No. 11,202,080, which is a
(Continued)

(51) Int. Cl.
  *H04N 19/159* (2014.01)
  *H04N 19/105* (2014.01)
  (Continued)

(52) U.S. Cl.
  CPC ......... *H04N 19/159* (2014.11); *H04N 19/105* (2014.11); *H04N 19/117* (2014.11);
  (Continued)

(58) Field of Classification Search
  CPC .......................... H04N 19/159; H04N 19/117
  See application file for complete search history.

(56) References Cited

U.S. PATENT DOCUMENTS

| 10,284,844 B1 | 5/2019 | Zhao et al. |
| 2012/0014455 A1* | 1/2012 | Joshi ................ H04N 19/61 375/240.18 |

(Continued)

FOREIGN PATENT DOCUMENTS

| CN | 101854549 A | 10/2010 |
| CN | 104662902 A | 5/2015 |

(Continued)

OTHER PUBLICATIONS

International search report issued in corresponding international application No. PCT/CN2019/107602 dated Jun. 23, 2020.
(Continued)

*Primary Examiner* — Jerry T Jean Baptiste
(74) *Attorney, Agent, or Firm* — Perkins Coie LLP

(57) ABSTRACT

Methods for determining a prediction value, an encoder, and a decoder are provided. Reconstructed values of neighboring samples of a current block are acquired, and then filtered to obtain a reference value set of the current block. When a size of the current block is smaller than a preset threshold value, a first constant value is calculated according to a bit depth value of a luma component of a sample in the current block. A difference between the first constant value and a first reference value in the reference value set is determined as a first prediction input value in a prediction input value set. Other prediction input values in the prediction input value (Continued)

set other than the first prediction input value are determined according to the reference value set. Prediction values of samples at specific positions in the current block is calculated and then filtered.

16 Claims, 6 Drawing Sheets

Related U.S. Application Data continuation of application No. PCT/CN2019/107602, filed on Sep. 24, 2019.

(51) Int. Cl.
    *H04N 19/117* (2014.01)
    *H04N 19/119* (2014.01)
    *H04N 19/176* (2014.01)
    *H04N 19/593* (2014.01)
    *H04N 19/70* (2014.01)

(52) U.S. Cl.
    CPC ......... *H04N 19/119* (2014.11); *H04N 19/176* (2014.11); *H04N 19/593* (2014.11); *H04N 19/70* (2014.11)

(56) References Cited

U.S. PATENT DOCUMENTS

2017/0094285 A1   3/2017   Said et al.
2017/0244974 A1*  8/2017  Min .................... H04N 19/117
2019/0200022 A1*  6/2019  Deng ................... G09G 3/3208

FOREIGN PATENT DOCUMENTS

| | | |
|---|---|---|
| CN | 104702962 A | 6/2015 |
| CN | 107801024 A | 3/2018 |
| CN | 109792520 A | 5/2019 |
| CN | 109862371 A | 6/2019 |
| CN | 109996080 A | 7/2019 |

OTHER PUBLICATIONS

Bross B et al: "Versatile Video Coding (Draft 6)", dated Jul. 31, 2019.

Pfaff (Fraunhofer) J et al: "CE3: Affine linear weighted intra prediction (CE3-4.1, CE3-4.2)", dated Mar. 25, 2019.

Extended European search report issued in corresponding European application No. 19945421.6 dated Sep. 23, 2021.

Notice of Allowance issued in corresponding U.S. Appl. No. 17/325,752 dated Aug. 5, 2021.

First Examination Report of the European application No. 19945421.6, dated May 16, 2022. 4 pages.

First Examination Report of the Indian application No. 202117016779, dated May 12, 2022. 5 pages with English Translation.

First Office Action of the Chinese application No. 202110412164 5, dated Jul. 19, 2022. 43 pages with English Translation.

* cited by examiner

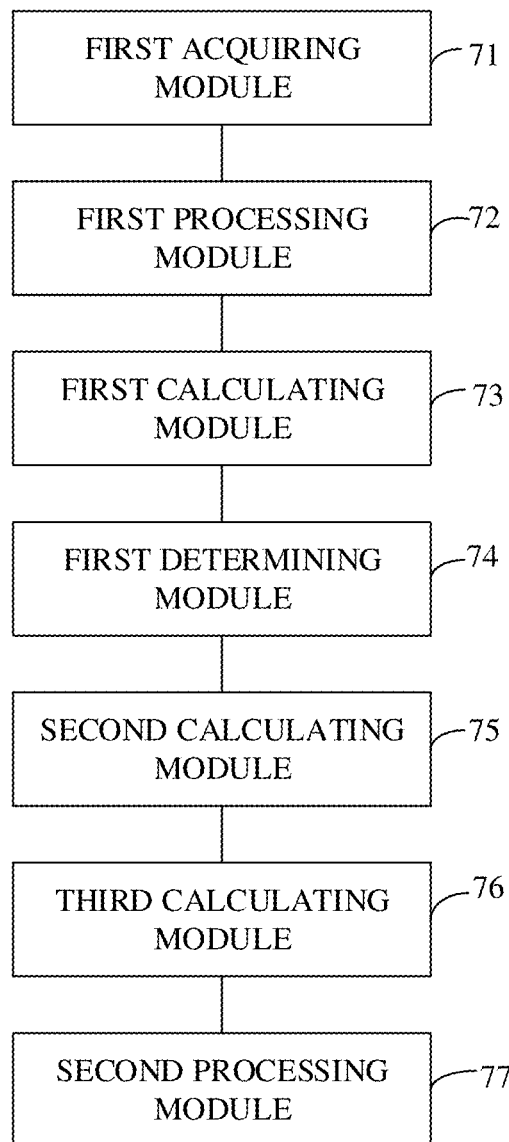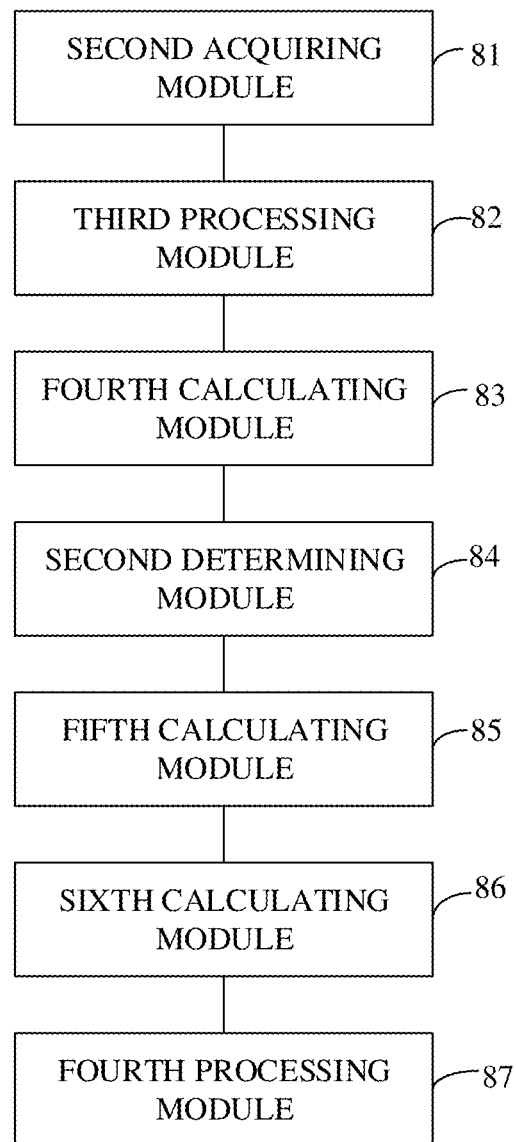

METHODS FOR DETERMINING PREDICTION VALUE, ENCODER, AND DECODER

CROSS REFERENCE TO RELATED APPLICATION(S)

This application is a continuation U.S. application Ser. No. 17/325,752, filed on May 20, 2021, which is a continuation of International Application No. PCT/CN2019/107602, filed on Sep. 24, 2019, the entire disclosure of which is incorporated herein by reference.

TECHNICAL FIELD

This disclosure relates to the field of matrix-based intra prediction (MIP) technology in intra prediction in video encoding, and more particularly to methods for determining a prediction value, an encoder, and a decoder.

BACKGROUND

Currently, in video encoding and decoding, there are three values involved in determining a prediction value based on MIP, which need to be obtained during calculation of the prediction value. The three values are respectively an MIP matrix, a weighting parameter, and a bit right shift parameter. In a conventional prediction-value determination method, in order to ensure full representation of a value range, the value of the bit right shift parameter cannot be too large. As a result, a value range of a prediction input value is too large in determining the prediction value, which affects prediction precision of the prediction value and thus affects efficiency in encoding and decoding. Therefore, the conventional prediction method in video encoding and decoding is low in prediction precision.

SUMMARY

In a first aspect, a method for determining a prediction value is provided. The method is applicable to an encoder. The method comprises the following. Reconstructed values of neighboring samples of a current block are acquired. The reconstructed values of the neighboring samples are filtered to obtain a reference value set of the current block. When a size of the current block is smaller than a preset threshold value, a first constant value is calculated according to a bit depth value of a luma component of a sample in the current block. A difference between the first constant value and a first reference value in the reference value set is determined as a first prediction input value in a prediction input value set. Other prediction input values in the prediction input value set other than the first prediction input value are determined according to the reference value set. Prediction values of samples at specific positions in the current block are calculated according to the prediction input value set. The prediction values of the samples at the specific positions are filtered to obtain prediction values of all samples in the current block.

In a second aspect, a method for determining a prediction value is provided. The method is applicable to a decoder. The method comprises the following. A bitstream is parsed to obtain a size of a current block and a coding mode of the current block. When the coding mode of the current block is an MIP mode, reconstructed values of neighboring samples of the current block are acquired and the reconstructed values of the neighboring samples are filtered to obtain a reference value set of the current block. When the size of the current block is smaller than a preset threshold value, a second constant value is calculated according to a bit depth value of a luma component of a sample in the current block. A difference between the second constant value and a first reference value in the reference value set is determined as a first prediction input value in a prediction input value set. Other prediction input values in the prediction input value set other than the first prediction input value are determined according to the reference value set. Prediction values of samples at specific positions in the current block are calculated according to the prediction input value set. Interpolation filtering is performed on the prediction values of the samples at the specific positions to obtain prediction values of samples at other positions in the current block other than the samples at the specific positions.

In a third aspect, an encoder is provided. The encoder comprises a processor and a storage medium configured to store instructions executable by the processor. The storage medium is operable with the processor via a communication bus. The instructions, when executed by the processor, are operable with the processor to perform the method described in one or more of the foregoing implementations.

In a fourth aspect, a decoder is provided. The decoder comprises a processor and a storage medium configured to store instructions executable by the processor. The storage medium is operable with the processor via a communication bus. The instructions, when executed by the processor, are operable with the processor to perform the method described in one or more of the foregoing implementations.

BRIEF DESCRIPTION OF THE DRAWINGS

FIG. 7 is a schematic structural diagram of an encoder according to implementations.

FIG. 8 is a schematic structural diagram of a decoder according to implementations.

DETAILED DESCRIPTION

The following will describe technical solutions of implementations clearly and comprehensively with reference to the accompanying drawings. It can be understood that, implementations described herein are merely intended for explaining, rather than limiting, the disclosure. In addition, for the convenience of description, only parts related to the disclosure are illustrated in the accompanying drawings.

In the field of video encoding, the latest versatile video coding (VVC) has adopted affine linear weighted intra prediction, which was proposed by HHI in joint video experts team (JVET)-N0217 and renamed MIP technology. In MIP technology, according to different sizes of intra luma coding blocks ("luma block" for short), different numbers of MIP modes are introduced in intra luma prediction.

In MIP technology, luma blocks are classified into three classes according to the size of the luma block. Supposing the size of the luma block is W*H, the luma blocks can be classified into the following three classes according to the size of the luma block: Luma blocks having a size of 4×4 belong to a first-class luma block, luma blocks having a size of 8×4, 4×8, or 8×8 belong to a second-class luma block, and luma blocks having other sizes belong to a third-class luma block. For these three classes of luma blocks, MIP technology has introduced M types of MIP modes on the basis of 67 traditional intra prediction modes.

Figure 1:
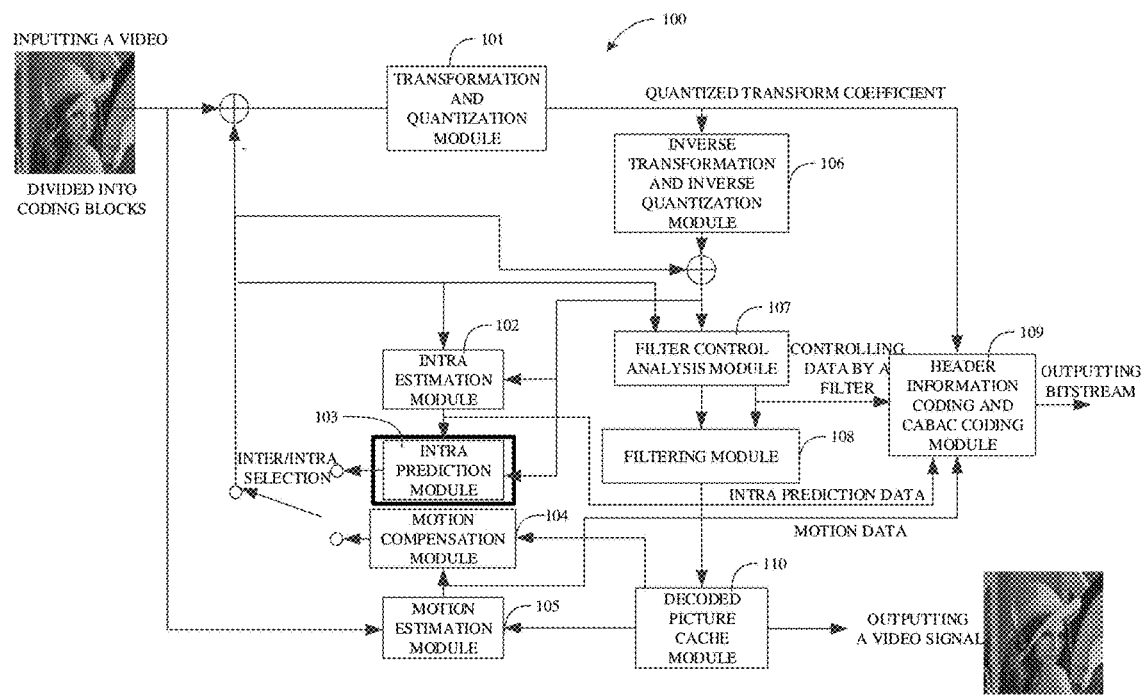
FIG. 1 is a schematic structural diagram of a video encoding system.

FIG. 1 is a schematic structural diagram of a video encoding system. As illustrated in FIG. 1, the video encoding system 100 includes a transformation and quantization module 101, an intra estimation module 102, an intra prediction module 103, a motion compensation module 104, a motion estimation module 105, an inverse transformation and inverse quantization module 106, a filter control analysis module 107, a deblocking (DBK) filtering and sample adaptive offset (SAO) filtering module 108, a header information coding and context-based adaptive binary arithmatic coding (CABAC) coding module 109, a decoded picture cache module 110, and the like.

Figure 2:
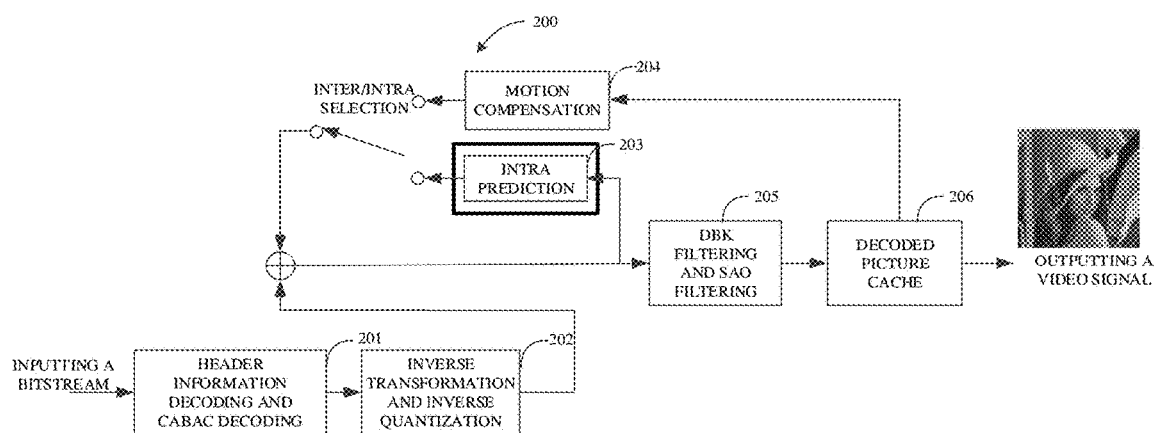
FIG. 2 is a schematic structural diagram of a video decoding system.

FIG. 2 is a schematic structural diagram of a video decoding system. As illustrated in FIG. 2, the video decoding system 200 includes a header information decoding and CABAC decoding module 201, an inverse transformation and inverse quantization module 202, an intra prediction module 203, a motion compensation module 204, a DBK filtering and SAO filtering module 205, a decoded picture cache module 206, and the like. After a video picture is processed by the transformation and quantization module 101, the intra estimation module 102, the intra prediction module 103, the motion compensation module 104, the motion estimation module 105, the DBK filtering and SAO filtering module 108, and the header information coding and CAB AC coding module 109 of the video encoding system 100, a bitstream of the video picture is outputted. The bitstream is then input into the video decoding system 200 and processed by the header information decoding and CABAC decoding module 201, the inverse transformation and inverse quantization module 202, the intra prediction module 203, and the motion compensation module 204 of the video decoding system 200, to restore an original video picture.

In encoding and decoding in an MIP mode, a prediction-value determination method is mainly applied to the intra prediction module 103 of the video encoding system and the intra prediction module 203 of the video decoding system and is applied to both an encoding side and a decoding side.

For the first-class luma block, M=35; for the second-class luma block, M=19; and for the third-class luma block, M=11.

MIP technology is applicable to intra luma prediction only. Similar to a traditional mode, for prediction in MIP, the input is the top row and left column of a current block (equivalent to an "picture block to-be-encoded" which will be hereinafter described), and the output is the prediction values of the current block. The process of prediction includes the following three steps: averaging, matrix vector multiplication, and interpolation. In other words, by performing the above three operations on input reconstruction luma values of neighboring samples in the top row and left column of the current block, luma prediction values of the current block can be obtained.

Figure 3:
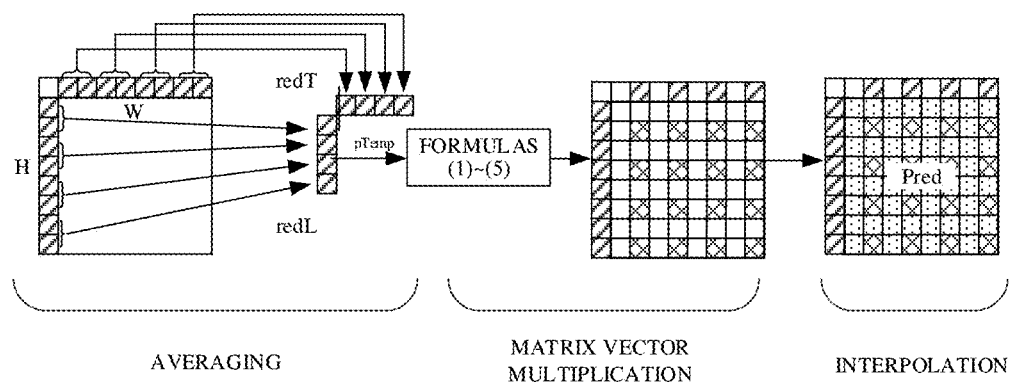
FIG. 3 is a schematic diagram illustrating a process of encoding samples in an MIP mode.

FIG. 3 is a schematic diagram illustrating a process of encoding samples in an MIP mode. As illustrated in FIG. 3, the process includes the following steps.

Step 1: Averaging is performed on top neighboring reference samples of a current luma block to obtain vector redT, which includes N values; and averaging is performed on left neighboring reference samples of the current luma block to obtain vector redL, which includes N values. When the luma block belongs to the first-class luma block, N=2; and when the luma block belongs to the second-class luma block or the third-class luma block, N=4. Vector redT and vector redL constitute a new vector pTemp, which is used for subsequent operations.

Step 2: Matrix mWeight, weighting parameter fO, and bit right shift parameter sW are obtained. Some prediction values in the current block, which are identified by cross lines in FIG. 3, can be obtained according to the following equations:

$$\text{predMip}[x][y]=(((\Sigma_{i=0}^{inSize}-m\text{Weight}[i][y*incH*\text{predC}+x*incW]*p[i])+oW)\gg sW)+ p\text{Temp}[0] \quad (1)$$

$$oW=(1\ll(sW-1))-fO*(\Sigma_{i=0}^{inSize-1}p[i]) \quad (2)$$

When MipSizeID=0 or 1, calculate according to the following equations:

$$p[0]=p\text{Temp}[0]-(1\ll(\text{BitDepth}-1)) \quad (3)$$

$$p[i]=p\text{Temp}[i]-p\text{Temp}[0] \; i=1,\ldots,\text{inSize}-1 \quad (4)$$

When MipSizeID=2, calculate according to the following equation:

$$p[i]=p\text{Temp}[i+1]-p\text{Temp}[0] \; i=0,\ldots,\text{inSize}-2 \quad (5)$$

predMip[x,y] represents a prediction value of a sample at position (x, y). pTemp[i] represents an $i^{th}$ reference value in a reference value set of the current block in prediction in the MIP mode. p[x] represents an $i^{th}$ prediction input value in prediction in the MIP mode. inSize is determined according to a serial number of MIP, that is, MipSizeID, where inSize=4 when MipSizeID=0, inSize=8 when MipSizeID=1, and inSize=7 when MipSizeID=2. The value of MipSizeID is determined according to the size of the current block, where MipSizeID=0 when the size of the current block is 4×4, MipSizeID=1 when the size of the current block is 4×8, 8×4, or 8×8, and MipSizeID=2 when the size of the current block is larger than 8×8. BitDepth represents a bit depth of a luma component (that is, the number of binary bits used for representing a sample value of the luma component). mWeight represents an MIP matrix. predC, incH, and incW are used for determining a parameter of a matrix element corresponding to sample position (x, y). "≫" is a bit right shift operator. oW represents a shift offset in a bit right shift operation. sW represents the bits of the right shift. fO represents a weighting parameter. sW and fO can be determined at least according to the size of the current block or the value of MipSizeID. For example, sW and fO can be determined according to a mapping table related to the value of MipSizeID, where the mapping table records at least values of sW and values of fO corresponding to different values of MipSizeID.

Step 3: the remaining prediction values in the current block are obtained through linear interpolation, that is, prediction values in the current block identified by multiple dots in FIG. 3.

The three values involved in MIP technology, which are respectively mWeight, fO, and sW, need to be obtained during determination of a prediction value. The value of mWeight is related to both a prediction mode and a spatial position of a sample, whereas the value of fO and the value of sW are related only to the prediction mode. p[i] is obtained by calculating according to equations (3), (4), and (5). The value of mWeight and the value of fO each are saved as an unsigned 7-digit binary number. sW represents an offset corresponding to the prediction mode, which has a value of 5, 6, or 7 according to the prediction mode (shown in Table 1 below) and can be obtained by referring to Table 1. A sample value of the sample can be obtained by calculating a matrix vector product, and thus an overall memory requirement is 4.5395 kilobytes.

TABLE 1

| | sW | | | | | | | | | | | | | | | | | |
|---|---|---|---|---|---|---|---|---|---|---|---|---|---|---|---|---|---|---|
| | modeId | | | | | | | | | | | | | | | | | |
| MipSizeId | 0 | 1 | 2 | 3 | 4 | 5 | 6 | 7 | 8 | 9 | 10 | 11 | 12 | 13 | 14 | 15 | 16 | 17 |
| 0 | 6 | 6 | 6 | 5 | 6 | 5 | 5 | 6 | 5 | 6 | 6 | 6 | 6 | 6 | 5 | 6 | 5 | 5 |
| 1 | 6 | 6 | 6 | 6 | 6 | 6 | 6 | 6 | 6 | 7 | | | | | | | | |
| 2 | 7 | 5 | 6 | 6 | 6 | 6 | | | | | | | | | | | | |

Figure 4:
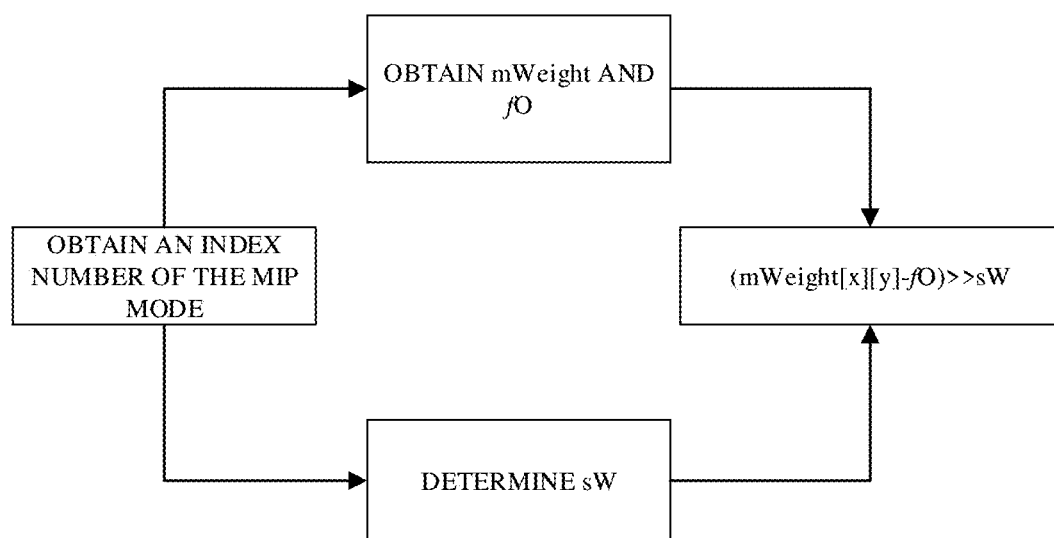
FIG. 4 is a schematic flowchart of encoding in an MIP mode.

In prediction in an MIP mode, for the current block, an index of the prediction mode first determined. According to the index of the prediction mode, a fixed sW value for the current block is obtained by referring to the table, and then mWeight-fO is obtained. Through right shift on mWeight-fO by sW bits, an original floating-point number matrix is obtained for calculating a prediction value. FIG. 4 is a schematic flowchart of encoding in an MIP mode.

As illustrated in FIG. 4, an index number of the MIP mode is first obtained. According to the index number of the MIP mode, machine trained mWeight and fO are obtained from a mapping table. According to the index number of the MIP mode, sW is obtained from the mapping table. (mWeight [x][y]−fO)»sW is performed for prediction, and a prediction value is obtained.

In other words, in existing MIP technology in VVC, original floating-point numbers mWeightf[x] [y] of all values of mWeight is a fixed-point representation of an offset starting from its minimum value (often negative, represented by fO):

$$mWeight[x][y]=(mWeight_f[x][y]+fO)«sW \quad (6)$$

mWeight[x][y] is saved as an unsigned 7-digit binary number, which results in loss in representation precision. Here, a larger sW leads to a higher precision. However, in order to ensure full representation of a value range, the value of sW cannot be too large. Since a same sW value is indiscriminately used in the whole matrix, a parameter with a small value range has to further reduce representation precision to adapt to a common value range of all parameters in the whole matrix. A parameter variation range in an original matrix is also related to the manner in which p[i] is obtained. The manner of calculating p[i] in the related art causes an extension of the parameter variation range, which reduces precision of data in a weight matrix, increases a prediction difference of the MIP mode, and thus reduces encoding efficiency.

Figure 5:
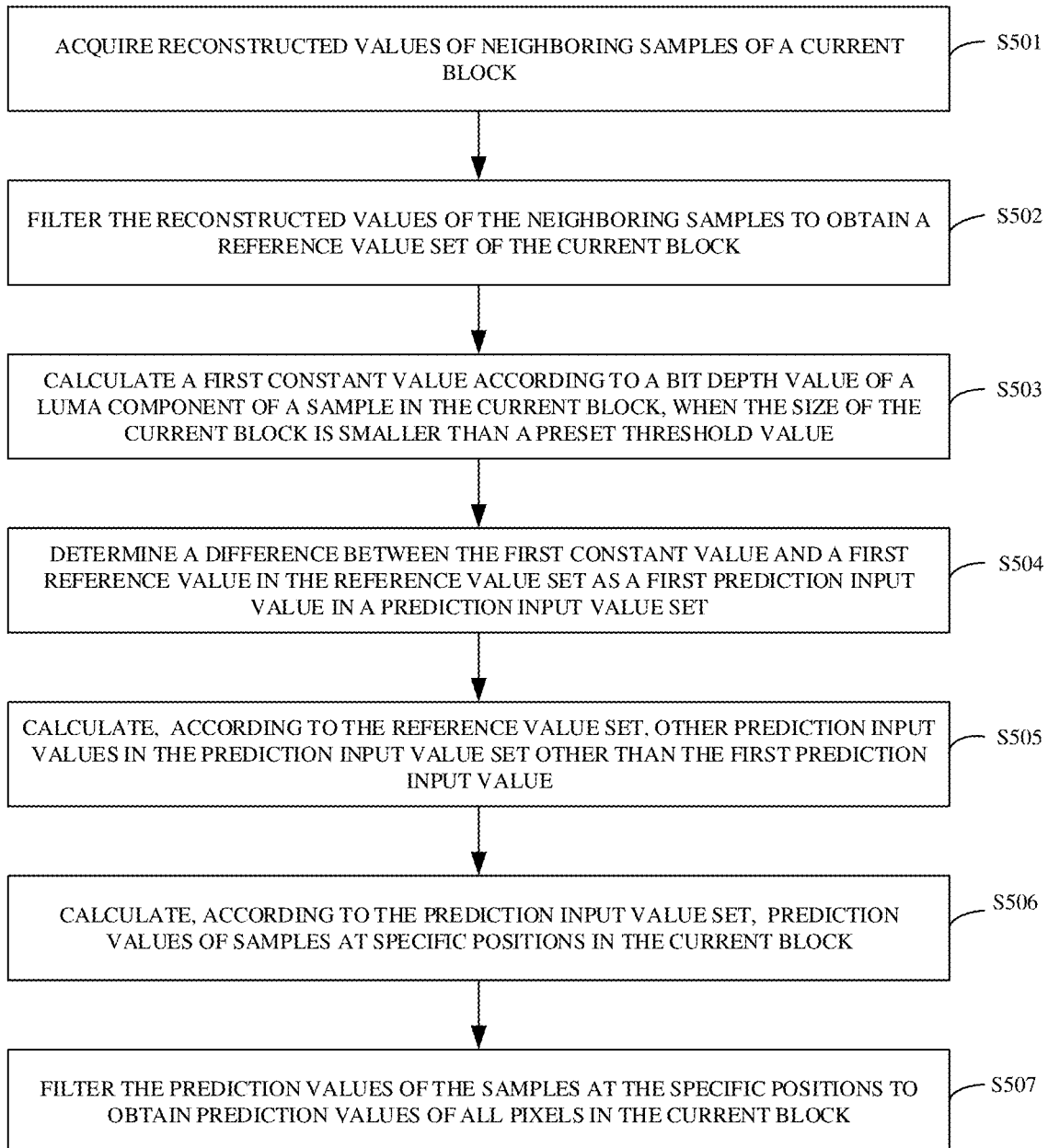
FIG. 5 is a schematic flowchart of a method for determining a prediction value according to implementations.

In order to improve prediction precision of the MIP mode and thus improve encoding efficiency, implementations provide a method for determining a prediction value. FIG. 5 is a schematic flowchart of a method for determining a prediction value according to implementations. As illustrated in FIG. 5, the method is applicable to an encoder. The method includes the following.

At block S501, reconstructed values of neighboring samples of a current block are acquired.

During encoding, in order to determine prediction values of the current block, the encoder first needs to acquire the reconstructed values of the neighboring samples of the current block. Here, the neighboring samples of the current block include samples in the top row and left column of the current block.

At block S502, the reconstructed values of the neighboring samples are filtered to obtain a reference value set of the current block.

After the reconstructed values of the neighboring samples are acquired, for example, the acquired reconstructed values of samples in the top row of the current block constitute redT (including N values), and the acquired reconstructed values of samples in the left column of the current block constitute redL (including N values), redT and redL constitute a new vector pTemp as the reference value set of the current block.

In order to obtain the reference value set of the current block through filtering, in some implementations, operations at block S502 may include the following. The reconstructed values of the neighboring samples are divided into N groups. For each of the N groups, an average value of reconstructed values in the group is calculated. The average value is assigned as a reference value in the reference value set, where N is a positive integer.

In some implementations, N is a positive integer value which is set in advance and corresponds to the size of the current block. In other words, the reconstructed values of the neighboring samples are filtered at block S502 as follows. redT and redL are divided into N groups, an average value of reconstructed values in each group is calculated to obtain N average values, and the N average values are assigned as reference values in the reference value set.

For example, when the size of the current block is 4×4, inSize=4; when the size of the current block is 4×8, 8×4, or 8×8, inSize=8; and when the size of the current block is larger than 8×8, inSize=7.

At block S503, when the size of the current block is smaller than a preset threshold value, a first constant value is calculated according to a bit depth value of a luma component of a sample in the current block.

In practice, the size of the current block is represented by MipSizeID. When MipSizeID is less than 2, that is, MipSizeID is equal to 0 or 1, the first constant value is calculated according to the bit depth value of the luma component of the sample in the current block.

In order to calculate the first constant value, in some implementations, operations at block S503 include the following. the first constant value is set to be a value obtained through a binary bit left shift operation on numerical value 1, where the number of shift bits in the binary bit left shift operation is equal to the bit depth value minus one.

The first constant value is a value obtained through a bit left shift operation on numerical value 1, and the bits of the left shift is equal to bit depth minus one.

At block S504, a difference between the first constant value and a first reference value in the reference value set is determined as a first prediction input value in a prediction input value set.

The prediction input value set is used for calculating a prediction value of the current block according to MIP. After the first constant value is obtained, in operations at block S504, the difference between the first constant value and the first reference value in the reference value set can be determined as the first prediction input value. The first prediction input value p[0] can be obtained according to the following equation:

$$p[0]=(1\ll(\text{BitDepth}-1)-p\text{Temp}[0]) \quad (7)$$

At block S505, other prediction input values in the prediction input value set other than the first prediction input value are determined according to the reference value set.

Other prediction input values p[i] include prediction input values other than the first prediction input value when the size of the current block is smaller than the preset threshold value. Other prediction input values p[i] can further include prediction input values when the size of the current block is larger than or equal to the preset threshold value. Other prediction input values p[i] can be obtained according to the following equation:

$$p[i]=p\text{Temp}[i+1]-p\text{Temp}[0] \, i=1,\ldots,\text{inSize}-1 \quad (8)$$

At block S506, prediction values of samples at specific positions in the current block are calculated according to the prediction input value set.

After all prediction input values are determined, the prediction input value set can be obtained. Prediction can be performed according to the prediction input value set, to obtain the prediction values of the samples at the specific positions in the current block, for example, prediction values of samples at positions identified by cross lines in FIG. 3.

In order to determine the prediction values of the samples at the specific positions in the current block, in some implementations, operations at block S506 include the following. An MIP matrix of the current block, a bit right shift parameter of the current block, and a weighting parameter of the current block are determined from one or more pre-stored mapping tables. The prediction values of the samples at the specific positions in the current block are calculated according to the prediction input value set, the MIP matrix of the current block, the bit right shift parameter of the current block, and the weighting parameter of the current block.

In other words, one or more mapping tables are pre-stored in the encoder. According to the one or more mapping tables, the MIP matrix of the current block (mWeight), the bit right shift parameter of the current block (sW), and the weighting parameter of the current block (PO) can be determined.

sW and fO can be determined at least according to the size of the current block or the value of MipSizeID. For example, the value of sW and the value of fO can be determined according to a mapping table related to the value of MipSizeID, where the mapping table records at least values of sW and values of fO corresponding to different values of MipSizeID.

Values in the above mapping table are constants, that is, values in the mapping table are not updated during calculation of MIP prediction values. Values of constants in the mapping table can be obtained through offline training according to equation (7) above. Alternatively, the values of constants in the mapping table can be derived from a mapping table corresponding to a different manner of calculating p[0] according to equation (7) above. According to implementations herein, mapping tables derived from an MIP mapping table of VVC committee draft (CD) are as follows:

If MipSizeID=0 and modeId=0, mWeight[x][y]=
{
{31, 59, 77, 28}, {36, 92, 85, 25}, {37, 69, 100, 24}, {35, 36, 106, 29}, {44, 49, 104, 48}, {44, 21, 94, 59}, {39, 0, 80, 72}, {33, 2, 66, 84}, {36, 13, 35, 99}, {29, 11, 34, 103}, {23, 21, 34, 106}, {17, 24, 40, 105}, {18, 28, 43, 101}, {12, 32, 49, 101}, {7, 31, 53, 102}, {7, 32, 54, 100}
}, If MipSizeID=0 and modeId=1, mWeight[x][y]=
{{22, 14, 70, 0}, {24, 17, 53, 5}, {28, 70, 32, 12}, {40, 82, 11, 19}, {20, 17, 63, 52}, {22, 17, 46, 63}, {25, 21, 29, 71}, {30, 25, 16, 74}, {20, 19, 16, 85}, {21, 19, 17, 85}, {20, 18, 20, 83}, {20, 18, 23, 82}, {20, 19, 22, 80}, {20, 18, 22, 80}, {20, 20, 22, 80}, {21, 21, 22, 80}}, If MipSizeID=0 and modeId=2, mWeight[x] [y]=
{{6, 7, 62, 10}, {7, 0, 33, 9}, {7, 12, 2, 6}, {7, 63, 3, 6}, {7, 7, 73, 6}, {7, 8, 71, 9}, {7, 1, 50, 9}, {7, 9, 14, 7}, {6, 7, 55, 22}, {7, 7, 72, 5}, {7, 9, 74, 7}, {7, 3, 62, 9}, {8, 6, 2, 77}, {7, 6, 33, 45}, {7, 7, 62, 14}, {7, 8, 70, 8}}, If MipSizeID=0 and modeId=3, mWeight[x][y]=
{{32, 32, 54, 34}, {32, 38, 34, 34}, {32, 94, 38, 30}, {34, 110, 40, 28}, {32, 30, 80, 32}, {32, 52, 56, 30}, {34, 106, 48, 30}, {44, 104, 38, 40}, {32, 30, 56, 72}, {48, 64, 38, 80}, {68, 90, 20, 86}, {76, 78, 8, 90}, {50, 32, 0, 122}, {76, 68, 4, 106}, {86, 74, 8, 96}, {82, 74, 8, 94}}, If MipSizeID=0 and modeId=4, mWeight[x] [y]=
{{27, 19, 44, 22}, {27, 35, 23, 27}, {26, 88, 29, 28}, {28, 91, 27, 27}, {32, 21, 87, 25}, {35, 22, 46, 20}, {32, 69, 26, 20}, {29, 87, 29, 23}, {32, 23, 40, 81}, {44, 16, 46, 66}, {53, 17, 17, 50}, {46, 37, 3, 40}, {31, 25, 21, 92}, {36, 24, 24, 91}, {43, 16, 23, 88}, {52, 11, 0, 81}}, If MipSizeID=0 and modeId=5, mWeight[x] [y]=
{{24, 24, 82, 26}, {24, 22, 76, 26}, {24, 32, 66, 24}, {24, 58, 56, 24}, {24, 26, 88, 22}, {24, 28, 88, 26}, {26, 26, 88, 26}, {24, 26, 86, 28}, {24, 26, 72, 40}, {24, 26, 84, 24}, {22, 28, 86, 22}, {26, 34, 82, 24}, {26, 24, 0, 110}, {26, 24, 14, 98}, {42, 26, 44, 62}, {80, 38, 76, 8}}, If MipSizeID=0 and modeId=6, mWeight[x] [y]=
{{20, 22, 48, 19}, {22, 20, 43, 18}, {21, 35, 35, 19}, {30, 62, 25, 17}, {21, 22, 47, 29}, {22, 21, 48, 27}, {23, 31, 45, 24}, {55, 44, 24, 8}, {21, 21, 25, 48}, {18, 23, 25, 51}, {39, 19, 23, 38}, {76, 27, 22, 0}, {22, 21, 20, 53}, {23, 19, 18, 54}, {60, 5, 12, 35}, {77, 25, 19, 3}}, If MipSizeID=0 and modeId=7, mWeight[x] [y]=
{{13, 10, 73, 12}, {13, 3, 54, 15}, {13, 0, 29, 14}, {13, 22, 13, 13}, {13, 13, 80, 10}, {14, 14, 86, 7}, {15, 11, 84, 8}, {14, 3, 68, 11}, {13, 12, 30, 59}, {14, 10, 45, 43}, {15, 11, 63, 26}, {17, 11, 75, 15}, {16, 10, 6, 83}, {18, 9, 6, 83}, {19, 8, 9, 78}, {24, 5, 21, 63}}, If MipSizeID=0 and modeId=8, mWeight[x] [y]=
{{24, 22, 74, 30}, {24, 20, 22, 44}, {26, 68, 6, 32}, {26, 90, 20, 28}, {24, 26, 46, 66}, {24, 20, 36, 74}, {24, 44, 10, 58}, {38, 82, 6, 30}, {24, 24, 34, 76}, {24, 24, 40, 74}, {24, 26, 32, 78}, {86, 42, 10, 32}, {26, 22, 38, 74}, {22, 26, 38, 74}, {40, 16, 36, 72}, {118, 0, 34, 32}}, If MipSizeID=0 and modeId=9, mWeight[x] [y]=
{{14, 39, 85, 0}, {15, 49, 42, 39}, {17, 30, 22, 66}, {17, 18, 19, 74}, {18, 19, 24, 73}, {17, 11, 13, 83}, {17, 12, 18, 78}, {17, 15, 19, 75}, {16, 15, 14, 78}, {16, 16, 19, 75}, {17, 17, 18, 75}, {18, 17, 18, 75}, {16, 16, 19, 75}, {17, 16, 18, 76}, {17, 16, 18, 76}, {18, 16, 19, 75}}, If MipSizeID=0 and modeId=10, mWeight[x][y]=
{{26, 24, 57, 22}, {30, 14, 30, 24}, {28, 61, 25, 25}, {26, 100, 29, 27}, {29, 27, 92, 30}, {31, 19, 72, 25}, {40, 15, 37, 21}, {46, 70, 24, 18}, {29, 26, 30, 89}, {30, 26, 34, 87}, {41, 14, 27, 81}, {67, 12, 0, 65}, {29, 26, 24, 92}, {29, 27, 24, 92}, {28, 29, 27, 93}, {36, 22, 25, 89}}, If MipSizeId=0 and modeId=11, mWeight[x][y]=
{{21, 19, 60, 7}, {26, 12, 35, 9}, {26, 14, 27, 11}, {22, 50, 24, 13}, {24, 18, 75, 38}, {29, 16, 60, 39}, {38, 6, 30, 41}, {41, 0, 3, 45}, {22, 19, 21, 84}, {23, 19, 21, 85}, {25, 20, 22, 84}, {28, 18, 16, 83}, {20, 20, 20, 83}, {20, 21, 21, 82}, {19, 21, 21, 83}, {19, 22, 22, 82}}, If MipSizeID=0 and modeId=12, mWeight[x][y]=
{{16, 14, 75, 3}, {16, 43, 57, 16}, {18, 63, 20, 43}, {14, 46, 0, 65}, {15, 20, 54, 52}, {15, 22, 23, 76}, {13, 17, 15, 83}, {10, 17, 17, 82}, {14, 17, 11, 84}, {12, 18, 14, 83}, {11, 20, 16, 81}, {9, 21, 16, 81}, {12, 18, 18, 80}, {10, 19, 17, 81}, {9, 20, 16, 82}, {8, 20, 16, 82}}, If MipSizeID=0 and modeId=13, mWeight[x][y]=
{{7, 6, 82, 0}, {7, 4, 83, 0}, {7, 2, 83, 0}, {7, 3, 80, 0}, {7, 8, 59, 16}, {7, 8, 58, 17}, {7, 8, 58, 17}, {7, 7, 57, 18}, {7, 7, 7, 70}, {7, 7, 7, 71}, {7, 7, 6, 71}, {7, 8, 7, 70}, {6, 7, 8, 71}, {6, 7, 8, 70}, {6, 7, 8, 70}, {6, 7, 9, 69}}, If MipSizeID=0 and modeId=14, mWeight[x][y]=
{{21, 16, 39, 18}, {19, 35, 27, 17}, {19, 56, 17, 28}, {30, 46, 8, 40}, {17, 26, 47, 25}, {21, 40, 24, 40}, {41, 31, 9, 46}, {57, 13, 10, 41}, {22, 25, 15, 55}, {49, 14, 12, 46}, {65, 3, 18, 36}, {63, 4, 19, 35}, {49, 8, 13, 46}, {65, 0, 19, 33}, {63, 1, 19, 35}, {61, 3, 18, 36}}, If MipSizeID=0 and modeId=15, mWeight[x][y]=
{{23, 43, 54, 26}, {23, 56, 50, 24}, {22, 57, 49, 25}, {23, 61, 47, 24}, {24, 51, 57, 20}, {21, 55, 51, 27}, {23, 56, 52, 24}, {24, 59, 51, 23}, {23, 43, 60, 24}, {27, 55, 58, 12}, {23, 58, 52, 23}, {24, 59, 52, 23}, {64, 26, 13, 80}, {89, 48, 51, 0}, {43, 57, 59, 7}, {24, 57, 54, 22}}, If MipSizeID=0 and modeId=16, mWeight[x][y]=
{{20, 20, 51, 22}, {21, 22, 51, 22}, {21, 29, 50, 22}, {21, 32, 48, 22}, {21, 23, 53, 22}, {21, 24, 53, 22}, {21, 23, 53, 22}, {21, 24, 53, 22}, {18, 24, 47, 28}, {18, 24, 48, 27}, {19, 25, 48, 26}, {20, 25, 48, 26}, {30, 16, 0, 71}, {35, 14, 1, 67}, {38, 14, 2, 64}, {38, 13, 4, 63}}, If MipSizeID=0 and modeId=17, mWeight[x][y]=
{{25, 21, 34, 25}, {27, 34, 3, 39}, {30, 55, 24, 23}, {26, 41, 40, 18}, {28, 22, 13, 48}, {44, 38, 6, 29}, {35, 44, 43, 10}, {25, 30, 45, 21}, {35, 29, 12, 44}, {56, 34, 31, 2}, {33, 30, 47, 14}, {24, 28, 44, 25}, {39, 37, 33, 19}, {48, 29, 40, 0}, {31, 25, 44, 19}, {25, 28, 44, 24}}, If MipSizeId=1, modeId=0, mWeight[x] [y]=
{{18, 22, 18, 20, 72, 43, 9, 19}, {18, 8, 22, 26, 56, 58, 5, 20}, {19, 21, 10, 35, 35, 72, 3, 20}, {21, 21, 21, 29, 18, 78, 7, 18}, {19, 16, 16, 19, 3, 70, 46, 8}, {21, 18, 15, 20, 4, 58, 61, 4}, {25, 16, 18, 18, 8, 42, 73, 3}, {28, 14, 20, 18, 13, 30, 76, 6}, {20, 18, 17, 17, 19, 4, 69, 40}, {24, 18, 17, 16, 19, 3, 55, 51}, {30, 14, 18, 15, 17, 5, 39, 63}, {31, 14, 18, 16, 16, 8, 28, 70}, {22, 15, 18, 16, 16, 20, 2, 92}, {26, 14, 18, 15, 15, 19, 0, 91}, {29, 15, 18, 16, 14, 19, 3, 88}, {29, 16, 17, 17, 15, 17, 7, 84}}, If MipSizeId=1 and modeId=1, mWeight[x][y]=
{{20, 35, 18, 20, 58, 35, 18, 20}, {20, 75, 26, 19, 32, 31, 20, 20}, {21, 6, 93, 22, 20, 25, 21, 20}, {24, 25, 0, 99, 18, 21, 21, 18}, {20, 28, 20, 20, 8, 78, 30, 19}, {20, 67, 22, 20, 10, 59, 27, 19}, {22, 7, 93, 18, 15, 30, 25, 20}, {26, 25, 1, 97, 20, 18, 22, 18}, {20, 28, 19, 20, 15, 14, 81, 25}, {20, 59, 20, 20, 12, 22, 65, 23}, {23, 7, 93, 16, 14, 24, 34, 22}, {30, 24, 3, 95, 19, 20, 20, 18}, {20, 29, 20, 20, 14, 23, 8, 90}, {20, 51, 19, 21, 14, 19, 15, 77}, {24, 7, 88, 16, 14, 20, 21, 43}, {33, 22, 6, 91, 19, 18, 20, 21}}, If MipSizeID=1 and modeId=2, mWeight[x][y]=
{{10, 19, 10, 12, 81, 14, 10, 11}, {10, 26, 15, 10, 79, 6, 12, 11}, {11, 16, 31, 12, 69, 2, 14, 10}, {11, 13, 8, 44, 54, 3, 14, 10}, {11, 11, 12, 11, 1, 83, 13, 9}, {11, 12, 12, 12, 11, 83, 4, 12}, {11, 15, 11, 13, 24, 77, 0, 12}, {11, 14, 13, 16, 38, 63, 2, 12}, {11, 12, 11, 11, 14, 2, 82, 12}, {11, 13, 12, 12, 10, 14, 79, 5}, {11, 12, 12, 13, 6, 29, 70, 3}, {11, 12, 11, 16, 3, 45, 55, 4}, {11, 12, 11, 12, 10, 12, 1, 84}, {11, 13, 11, 12, 12, 8, 13, 76}, {11, 12, 12, 13, 14, 3, 29, 64}, {11, 13, 10, 17, 15, 0, 45, 49}}, If MipSizeID=1 and modeId=3, mWeight[x][y]=
{{21, 50, 24, 20, 19, 38, 22, 24}, {22, 53, 41, 23, 14, 22, 27, 27}, {22, 22, 66, 37, 19, 17, 25, 28}, {27, 19, 12, 92, 19, 18, 21, 28}, {21, 51, 25, 20, 19, 23, 48, 27}, {21, 41, 48, 24, 17, 11, 36, 37}, {24, 17, 58, 43, 14, 17, 23, 39}, {39, 22, 4, 91, 15, 20, 16, 33}, {20, 44, 27, 21, 16, 20, 35, 54}, {22, 31, 53, 24, 13, 19, 21, 55}, {30, 14, 47, 50, 10, 20, 16, 48}, {57, 28, 0, 82, 19, 14, 18, 30}, {22, 34, 30, 21, 15, 22, 21, 70}, {24, 22, 52, 26, 12, 24, 16, 61}, {38, 17, 33, 56, 14, 18, 16, 49}, {66, 32, 0, 75, 26, 4, 22, 30}}, If MipSizeID=1 and modeId=4, mWeight[x][y]=
{{18, 32, 15, 16, 60, 34, 10, 19}, {18, 68, 28, 13, 31, 37, 11, 17}, {19, 8, 73, 23, 15, 30, 22, 14}, {19, 18, 0, 85, 11, 17, 33, 15}, {18, 18, 19, 17, 9, 56, 56, 9}, {19, 19, 20, 16, 13, 30, 73, 14}, {19, 20, 20, 18, 13, 13, 71, 28}, {18, 18, 16, 26, 12, 8, 54, 47}, {17, 16, 17, 17, 17, 10, 54, 51}, {16, 17, 16, 18, 16, 15, 28, 73}, {16, 18, 15, 18, 16, 20, 14, 83}, {15, 19, 17, 18, 15, 21, 14, 82}, {16, 17, 16, 18, 17, 18, 7, 90}, {15, 18, 16, 19, 16, 17, 11, 87}, {14, 18, 16, 20, 17, 15, 15, 84}, {13, 19, 16, 22, 17, 15, 18, 81}}, If MipSizeID=1 and modeId=5, mWeight[x][y]=
{{11, 6, 13, 11, 75, 6, 12, 11}, {12, 3, 8, 13, 48, 2, 13, 10}, {12, 45, 1, 13, 19, 9, 12, 10}, {12, 42, 37, 8, 10, 12, 11, 10}, {11, 11, 10, 12, 18, 74, 6, 11}, {11, 12, 10, 12, 53, 47, 2, 12}, {12, 6, 10, 12, 71, 16, 9, 11}, {12, 15, 6, 13, 53, 5, 13, 10}, {12, 12, 10, 11, 9, 17, 77, 5}, {12, 11, 9, 12, 3, 51, 50, 2}, {12, 11, 9, 12, 11, 72, 18, 8}, {12, 11, 9, 12, 36, 57, 7, 10}, {12, 10, 10, 11, 10, 10, 16, 71}, {13, 11, 10, 11, 14, 0, 56, 39}, {13, 11, 9, 12, 12, 8, 76, 13}, {13, 12, 9, 12, 8, 35, 57, 7}}, If MipSizeID=1 and modeId=6, mWeight[x][y]=
{{23, 21, 23, 23, 101, 30, 19, 25}, {24, 13, 23, 24, 101, 29, 19, 25}, {24, 24, 14, 23, 101, 29, 18, 24}, {24, 23, 25, 17, 98, 29, 18, 24}, {23, 24, 23, 23, 0, 97, 36, 17}, {24, 25, 24, 22, 1, 97, 35, 17}, {24, 22, 25, 23, 1, 96, 36, 17}, {24, 22, 23, 24, 3, 94, 36, 17}, {24, 23, 23, 22, 31, 0, 93, 34}, {24, 23, 24, 23, 31, 2, 93, 33}, {24, 22, 24, 23, 31, 1, 92, 34}, {24, 22, 23, 23, 30, 3, 90, 35}, {23, 24, 23, 23, 19, 31, 2, 102}, {23, 23, 23, 24, 19, 30, 3, 101}, {23, 23, 24, 24, 19, 30, 3, 101}, {23, 23, 23, 24, 19, 31, 4, 100}}

If MipSizeID=1 and modeId=7, mWeight[x][y]=
{{10, 5, 10, 10, 56, 4, 11, 9}, {11, 22, 6, 10, 13, 9, 10, 10}, {11, 67, 22, 6, 10, 10, 10, 10}, {11, 6, 68, 18, 11, 9, 11, 9}, {10, 10, 10, 10, 40, 53, 3, 11}, {11, 6, 10, 9, 61, 9, 10, 9}, {11, 17, 6, 10, 23, 7, 9, 10}, {11, 56, 15, 8, 10, 11, 9, 10}, {10, 9, 11, 9, 4, 42, 54, 3}, {11, 10, 11, 9, 22, 67, 8, 8}, {10, 7, 11, 9, 57, 23, 7, 10}, {11, 11, 10, 10, 36, 8, 10, 9}, {10, 10, 11, 9, 13, 0, 41, 50}, {11, 9, 11, 9, 8, 24, 64, 8}, {10, 10, 11, 9, 15, 63, 18, 10}, {11, 10, 11, 10, 44, 33, 10, 11}}, If MipSizeID=1 and modeId=8, mWeight[x][y]=
{{21, 44, 37, 20, 24, 68, 10, 23}, {21, 1, 55, 39, 14, 39, 41, 18}, {21, 25, 0, 68, 18, 18, 42, 39}, {22, 24, 19, 36, 19, 14, 25, 72}, {21, 11, 28, 30, 18, 23, 80, 19}, {22, 25, 8, 38, 21, 13, 45, 62}, {22, 22, 18, 25, 19, 18, 16, 90}, {23, 21, 21, 24, 19, 21, 12, 91}, {21, 22, 15, 28, 21, 20, 23, 82}, {22, 21, 19, 24, 20, 22, 9, 95}, {23, 21, 21, 22, 20, 21, 13, 92}, {23, 22, 21, 22, 19, 21, 15, 90}, {22, 21, 20, 22, 21, 22, 15, 90}, {22, 21, 21, 22, 20, 21, 16, 89}, {23, 21, 20, 23, 19, 22, 15, 89}, {24, 21, 20, 23, 19, 23, 15, 87}}, If MipSizeID=1 and modeId=9, mWeight[x][y]=
{{8, 15, 18, 15, 51, 68, 39, 23}, {7, 4, 10, 20, 22, 76, 51, 27}, {7, 16, 1, 17, 13, 78, 55, 29}, {7, 13, 24, 0, 12, 76, 55, 27}, {7, 8, 10, 14, 10, 66, 72, 25}, {6, 12, 8, 14, 12, 59, 75, 27}, {5, 13, 9, 12, 13, 58, 75, 28}, {4, 14, 8, 13, 14, 60, 71, 29}, {7, 10, 11, 12, 12, 42, 79, 41}, {4, 14, 8, 14, 13, 45, 79, 39}, {3, 14, 8, 14, 12, 44, 81, 38}, {2, 15, 10, 14, 13, 45, 78, 36}, {7, 11, 12, 13, 13, 24, 73, 62}, {4, 15, 8, 13, 15, 28, 89, 43}, {1, 14, 10, 14, 16, 29, 85, 45}, {1, 16, 9, 15, 17, 33, 78, 46}}, If MipSizeID=2 and modeId=0, mWeight[x] [y]=
{{46, 7, 14, 92, 23, 20, 10}, {32, 22, 17, 52, 50, 25, 14{1, 36, 21, 27, 61, 30, 14}, {0, 30, 27, 17, 61, 32, 17}, {13, 12, 37, 13, 59, 35, 18}, {14, 13, 38, 11, 56, 38, 18}, {10, 27, 29, 9, 55, 39, 17}, {10, 27, 32, 7, 53, 38, 17}, {8, 17, 14, 15, 92, 27, 13}, {2, 16, 18, 8, 84, 38, 15}, {4, 12, 22, 7, 76, 44, 17}, {8, 8, 25, 7, 72, 46, 18}, {8, 8, 26, 8, 69, 46, 19}, {10, 11, 23, 9, 68, 47, 17}, {10, 11, 23, 8, 67, 47, 18}, {10, 12, 26, 9, 64, 43, 20}, {7, 10, 16, 11, 86, 37, 17}, {7, 9, 18, 9, 73, 47, 20}, {8, 8, 21, 9, 67, 50, 22}, {7, 9, 22, 9, 66, 50, 22}, {7, 9, 23, 8, 67, 48, 22}, {8, 9, 24, 8, 67, 48, 21}, {8, 9, 26, 8, 66, 49, 20}, {9, 8, 29, 8, 64, 48, 20}, {8, 8, 16, 8, 69, 56, 19}, {6, 9, 17, 8, 64, 55, 25}, {7, 8, 19, 8, 62, 53, 27}, {7, 8, 21, 8, 61, 52, 28}, {7, 9, 22, 7, 62, 52, 25}, {7, 9, 23, 6, 62, 53, 24}, {8, 7, 26, 6, 62, 52, 23}, {8, 8, 28, 6, 61, 51, 22}, {7, 9, 14, 7, 49, 74, 23}, {7, 7, 17, 7, 51, 65, 30}, {7, 8, 18, 6, 53, 57, 33}, {7, 8, 20, 5, 56, 57, 31}, {7, 8, 22, 6, 56, 57, 29}, {8, 8, 23, 5, 57, 57, 27}, {8, 7, 26, 5, 57, 56, 26}, {8, 6, 27, 5, 57, 55, 25}, {7, 8, 14, 6, 36, 65, 47}, {7, 7, 18, 5, 44, 59, 44}, {7, 7, 19, 5, 47, 59, 40}, {7, 7, 20, 5, 50, 59, 35}, {8, 6, 22, 5, 51, 58, 33}, {8, 5, 25, 5, 51, 59, 30}, {7, 6, 26, 5, 51, 59, 29}, {9, 6, 27, 5, 50, 59, 28}, {7, 8, 14, 6, 27, 44, 76}, {6, 8, 16, 5, 38, 57, 53}, {6, 7, 19, 4, 44, 63, 40}, {7, 6, 21, 4, 47, 62, 37}, {8, 6, 22, 4, 47, 62, 35}, {8, 6, 24, 5, 46, 64, 32}, {8, 6, 26, 5, 46, 63, 31}, {8, 6, 28, 6, 45, 62, 30}, {8, 7, 15, 6, 22, 43, 81}, {6, 8, 16, 5, 32, 64, 51}, {8, 8, 19, 5, 37, 66, 41}, {9, 5, 21, 4, 41, 67, 36}, {8, 7, 22, 5, 42, 65, 35}, {8, 6, 25, 6, 42, 64, 34}, {9, 5, 27, 7, 43, 63, 32}, {9, 5, 29, 8, 40, 60, 34}}, If MipSizeID=2 and modeId=1, mWeight[x][y]=
{{50, 47, 46, 61, 50, 45, 46}, {59, 49, 47, 57, 51, 45, 46}, {64, 52, 48, 55, 51, 46, 46}, {58, 61, 50, 53, 51, 46, 46}, {52, 66, 53, 52, 51, 46, 46}, {48, 62, 62, 50, 51, 46, 46}, {47, 49, 76, 49, 51, 46, 46}, {45, 33, 92, 49, 52, 46, 46}, {50, 48, 46, 57, 63, 45, 46}, {55, 52, 48, 55, 63, 45, 46}, {57, 56, 50, 53, 63, 45, 46}, {55, 60, 53, 51, 63, 46, 46}, {51, 60, 59, 51, 63, 46, 46}, {48, 55, 69, 49, 63, 46, 46}, {46, 42, 84, 48, 62, 46, 46}, {43, 28, 99, 48, 61, 47, 46}, {49, 49, 47, 48, 73, 47, 46}, {52, 52, 49, 47, 73, 48, 46}, {52, 55, 53, 47, 72, 48, 46}, {51, 56, 58, 46, 72, 48, 46}, {48, 54, 65, 46, 71, 48, 46}, {46, 47, 76, 45, 71, 49, 46}, {44, 34, 91, 44, 70, 49, 46}, {41, 23, 04, 45, 68, 50, 46}, {48, 48, 48, 44, 68, 59, 45}, {50, 51, 51, 43, 69, 58, 45}, {49, 52, 56, 43, 68, 58, 45}, {48, 52, 62, 42, 68, 58, 45}, {45, 48, 71, 42, 68, 58, 45}, {43, 38, 84, 41, 68, 59, 45}, {41, 27, 98, 41, 67, 59, 45}, {38, 19, 109, 42, 66, 59, 45}, {47, 47, 49, 44, 52, 74, 45}, {48, 48, 53, 43, 54, 74, 45}, {47, 48, 60, 43, 55, 73, 45}, {45, 46, 68, 43, 55, 73, 45}, {43, 40, 78, 42, 56, 72, 45}, {41, 30, 91, 42, 57, 72, 45}, {38, 20, 105, 41, 57, 71, 45}, {36, 13, 114, 41, 57, 70, 46}, {46, 47, 50, 45, 43, 77, 51}, {46, 46, 56, 44, 44, 78, 51}, {45, 43, 64, 43, 45, 77, 51}, {43, 39, 73, 43, 45, 77, 51}, {40, 31, 85, 42, 46, 77, 51}, {38, 22, 98, 42, 46, 77, 51}, {35, 12, 111, 42, 47, 76, 51}, {33, 7, 19, 41, 48, 75, 52}, {46, 46, 51, 45, 44, 57, 71}, {45, 43, 59, 44, 44, 58, 70}, {43, 37, 68, 43, 45, 58, 70}, {40, 31, 80, 43, 45, 58, 70}, {38, 22, 92, 43, 46, 58, 70}, {36, 13, 105, 43, 46, 58, 70}, {33, 5, 117, 42, 47, 58, 70}, {31, 2, 123, 42, 48, 57, 71}, {45, 41, 55, 45, 51, 24, 96}, {44, 36, 64, 44, 52, 23, 97}, {42, 29, 75, 43, 53, 23, 97}, {39, 22, 86, 43, 52, 24, 97}, {37, 14, 98, 43, 53, 24, 97}, {34, 7, 109, 42, 53, 25, 97}, {32, 1, 118, 41, 53, 25, 97}, {30, 0, 123, 41, 53, 26, 96}}, If MipSizeID=2 and modeId=2, mWeight[x] [y]=
{{20, 16, 16, 76, 9, 8, 16}, {37, 15, 16, 71, 11, 17, 16}, {65, 13, 17, 67, 12, 17, 16}, {63, 30, 15, 63, 14, 17, 16}, {30, 62, 13, 57, 16, 17, 16}, {14, 62, 28, 52, 18, 16, 16}, {21, 22, 64, 46, 21, 15, 16}, {26, 0, 81, 40, 24, 15, 17}, {23, 16, 16, 69, 48, 8, 18}, {28, 18, 16, 66, 50, 8, 17}, {36, 17, 17, 61, 54, 7, 18}, {40, 20, 17, 56, 57, 7, 18}, {34, 29, 18, 50, 61, 6, 18}, {27, 34, 22, 44, 64, 5, 18}, {25, 22, 37, 37, 67, 5, 18}, {26, 9, 51, 31, 68, 6, 18}, {18, 17, 17, 17, 87, 9, 17}, {19, 17, 17, 15, 88, 9, 17}, {20, 18, 17, 14, 88, 10, 17}, {22, 17, 18, 12, 87, 12, 17}, {23, 18, 19, 11, 85, 15, 16}, {23, 20, 19, 11, 83, 18, 16}, {22, 19, 22, 10, 79, 22, 16}, {22, 16, 28, 11, 74, 26, 15}, {16, 17, 16, 7, 58, 50, 10}, {17, 17, 16, 8, 53, 55, 10}, {18, 17, 17, 10, 47, 60, 9}, {18, 16, 17, 11, 43, 64, 9}, {19, 16, 17, 12, 38, 68, 9}, {20, 17, 18, 13, 35, 72, 9}, {20, 17, 19, 14, 31, 74, 9}, 120, 16, 21, 13, 29, 74, 11}, {17, 16, 16, 16, 15, 86, 11}, {18, 15, 17, 16, 13, 86, 13}, {18, 16, 16, 16, 13, 84, 151, {18, 15, 17, 16, 12, 82, 18}, {19, 16, 17, 16, 12, 79, 21}, {18, 16, 17, 16, 12, 76, 24}, {18, 16, 17, 15, 12, 73, 28}, {19, 16, 19, 15, 14, 68, 31}, {17, 17, 16, 17, 10, 59, 43}, {17, 16, 16, 17, 10, 54, 47}, {18, 16, 16, 17, 11, 48, 52}, {18, 16, 16, 16, 12, 44, 56}, {17, 17, 16, 16, 13, 40, 59}, {17, 17, 16, 16, 13, 37, 62}, {17, 17, 17, 15, 14, 34, 65}, {18, 16, 18, 16, 14, 32, 66}, {17, 16, 16, 15, 16, 17, 79}, {17, 16, 16, 16, 16, 15, 81}, {18, 16, 16, 16, 16, 14, 82}, {18, 16, 16, 15, 16, 13, 83}, {17, 18, 16, 15, 16, 13, 83}, {17, 17, 17, 15, 16, 13, 84}, {17, 17, 17, 15, 16, 13, 84}, {17, 16, 18, 15, 16, 13, 83}, {16, 16, 16, 16, 17, 3, 92}, {17, 16, 16, 15, 17, 4, 91}, {18, 17, 17, 14, 18, 4, 90}, {18, 17, 16, 14, 18, 4, 91}, {17, 18, 16, 15, 18, 4, 91}, {17, 18, 17, 15, 18, 4, 90}, {17, 17, 18, 14, 18, 4, 90}, {18, 16, 19, 15, 18, 5, 89}}, If MipSizeID=2 and modeId=3, mWeight[x][y]=,
{{13, 9, 10, 43, 11, 12, 9}, {43, 2, 11, 22, 15, 12, 10}, {73, 2, 11, 16, 16, 12, 9}, {52, 38, 5, 13, 16, 12, 10}, {11, 71, 6, 12, 14, 13, 10}, {3, 50, 35, 10, 14, 13, 9}, {11, 12, 68, 11, 13, 13, 10}, {13, 3, 74, 12, 11, 15, 10}, {20, 9, 10, 51, 29, 11, 10}, {41, 5, 10, 37, 26, 13, 10}, {58, 9, 10, 23, 27, 14, 9}, {41, 36, 6, 15, 24, 16, 10}, {14, 57, 11, 11, 21, 18, 9}, {7, 39, 37, 9, 18, 19, 9}, {12, 9, 63, 10, 15, 20, 9}, {15, 2, 68, 11, 12, 21, 10}, {16, 11, 11, 19, 60, 11, 11}, {27, 11, 11, 20, 50, 16, 10}, {35, 15, 11, 17, 42, 20, 10}, {29, 29, 11, 12, 35, 23, 10}, {17, 37, 18, 8, 29, 26, 9}, {13, 26, 35, 6, 24, 27, 9}, {15, 8, 53, 7, 19, 27, 10}, {16, 4, 57, 9, 14, 28, 11}, {12, 11, 11, 5, 51, 36, 8}, {15, 13, 12, 8, 45, 36, 9}, {19, 16, 14, 9, 38, 38, 9}, {19, 21, 16, 8, 32, 39, 10}, {18, 22, 21, 7, 27, 39, 10}, {18, 16, 31, 7, 22, 39, 11}, {18, 9, 41, 6, 18, 39, 11}, {19, 7, 44, 7, 15, 37, 13}, {11, 12, 11, 9, 18, 64, 10}, {11, 12, 13, 10, 18, 61, 11}, {13, 13, 15, 10, 17, 58, 12}, {15, 14, 17, 10, 16, 56, 13}, {17, 14, 20, 9, 14, 55, 13}, {18, 11, 26, 9, 13, 52, 14}, {19, 9, 31, 8, 11, 50, 15}, {19, 9, 33, 8, 10, 46, 17}, {10, 11, 12, 11, 4, 59, 28}, {11, 10, 13, 11, 4, 60, 26}, {12, 10, 15, 11, 5, 59, 25}, {14, 10, 16, 11, 5, 58, 24}, {15, 10, 18, 11, 4, 57, 24}, {17, 9, 21, 11, 4, 56, 24}, {19, 9, 23, 10, 4, 53, 24}, {19, 9, 26, 10, 5, 49, 25}, {10, 10, 12, 11, 5, 27, 60}, {11, 8, 14, 11, 3, 34, 54}, {13, 8, 15, 12, 2, 38, 50}, {13, 8, 15, 13, 1, 41, 47}, {15, 8, 17, 13, 0, 42, 45}, {16, 8, 18, 13, 0, 44, 43}, {18, 8, 19, 12, 0, 44, 41}, {19, 9, 21, 12, 1, 43, 39}, {11, 8, 12, 11, 6, 9, 77}, {13, 7, 13, 12, 4, 16, 72}, {15, 6, 14, 13, 2, 21, 67}, {15, 6, 14, 13, 1, 25, 63}, {15, 7, 15, 14, 0, 27, 61}, {16, 8, 15, 14, 0, 29, 58}, {17, 8, 17, 14, 0, 29, 56}, {18, 8, 18, 14, 1, 30, 53}}, If MipSizeID=2 and modeId=4, mWeight[x] [y]=
{{15, 13, 13, 55, 12, 13, 13}, {21, 13, 13, 34, 14, 13, 13}, {39, 12, 13, 22, 14, 13, 13}, {55, 18, 12, 18, 14, 13, 13}, {48, 37, 11, 16, 14, 14, 13}, {23, 62, 13, 14, 14, 13, 13}, {11, 53, 35, 14, 14, 13, 12}, {15, 13, 72, 14, 14, 13, 12}, {16, 13, 13, 63, 27, 12, 13}, {17, 13, 13, 58, 19, 13, 13}, {22, 13, 13, 43, 18, 13, 13}, {33, 14, 12, 31, 17, 14, 13}, {45, 18, 12, 24, 16, 14, 12}, {44, 32, 12, 19, 15, 14, 13}, {29, 49, 15, 17, 14, 14, 12}, {18, 44, 33, 16, 15, 13, 12}, {15, 13, 13, 32, 60, 10, 13}, {16, 13, 13, 45, 44, 12, 13}, {17, 14, 13, 49, 32, 13, 12}, {21, 14, 13, 44, 25, 14, 12}, {30, 14, 13, 37, 21, 14, 12}, {39, 16, 13, 30, 18, 14, 12}, {39, 27, 13, 24, 17, 14, 12}, {31, 38, 16, 21, 17, 13, 12}, {13, 13, 13, 13, 64, 27, 11}, {14, 13, 13, 23, 61, 19, 12}, {15, 14, 13, 34, 51, 16, 12}, {17, 14, 13, 40, 42, 15, 12}, {20, 14, 13, 40, 34, 14, 12}, {27, 14, 13, 37, 29, 14, 12}, {33, 16, 13, 32, 25, 13, 12}, {33, 24, 14, 27, 23, 13, 12}, {13, 13, 13, 13, 33, 61, 9}, {13, 13, 13, 15, 47, 44, 10}, {14, 13, 13, 20, 54, 31, 11}, {15, 13, 13, 27, 53, 23, 11}, {16, 14, 13, 32, 49, 18, 12}, {19, 14, 13, 34, 43, 15, 12}, {24, 14, 13, 34, 37, 14, 12}, {28, 17, 13, 31, 32, 14, 12}, {13, 14, 13, 15, 10, 71, 20}, {13, 13, 13, 15, 22, 66, 13}, {14, 13, 13, 15, 37, 53, 11}, {14, 13, 13, 18, 47, 40, 11}, {14, 13, 13, 23, 52, 29, 11}, {15, 14, 13, 27, 51, 23, 11}, {18, 14, 13, 30, 47, 19, 11}, {22, 15, 13, 30, 42, 17, 12}, {13, 13, 13, 14, 12, 34, 57}, {13, 13, 13, 15, 14, 50, 38}, {13, 13, 13, 15, 21, 58, 23}, {14, 13, 13, 16, 32, 54, 16}, {13, 13, 13, 18, 41, 45, 13}, {13, 14, 13, 21, 47, 36, 12}, {14, 14, 13, 24, 49, 28, 12}, {17, 14, 13, 26, 46, 24, 12}, {13, 13, 13, 13, 19, 0, 85}, {13, 13, 13, 13, 20, 12, 72}, {13, 13, 13, 15, 20, 30, 53}, {13, 13, 13, 16, 23, 44, 35}, {13, 14, 12, 17, 29, 47, 24}, {13, 14, 13, 18, 36, 44, 18}, {13, 14, 13, 20, 41, 38, 16}, {15, 14, 14, 22, 42, 33, 15}}, If MipSizeId=2 and modeId=5, mWeight[x][y]=
{{24, 9, 10, 52, 13, 10, 12}, {53, 9, 10, 25, 26, 6, 13}, {48, 30, 9, 11, 30, 7, 13}, {15, 59, 12, 6, 25, 13, 11}, {5, 48, 34, 7, 18, 19, 10}, {10, 15, 62, 8, 12, 20, 13}, {13, 2, 70, 8, 9, 19, 19}, {13, 3, 62, 9, 6, 16, 30}, {25, 14, 10, 40, 51, 0, 14}, {20, 28, 11, 16, 55, 5, 13}, {8, 38, 18, 6, 41, 20, 11}, {5, 28, 34, 6, 23, 31, 12}, {9, 12, 48, 8, 12, 33, 18}, {12, 2, 53, 9, 6, 30, 28}, {14, 1, 50, 9, 4, 23, 40}, {14, 5, 42, 8, 4, 15, 51}, {8, 20, 12, 5, 72, 12, 12}, {2, 24, 19, 5, 46, 35, 9}, {5, 16, 29, 9, 21, 48, 13}, {9, 6, 36, 10, 9, 45, 25}, {12, 3, 37, 11, 5, 36, 38}, {13, 4, 34, 11, 4, 25, 51}, {13, 6, 29, 10, 4, 16, 61}, {13, 9, 26, 10, 6, 11, 66}, {6, 14, 15, 6, 31, 60, 6}, {7, 10, 22, 11, 12, 64, 15}, {10, 6, 26, 13, 6, 50, 32}, {11, 4, 27, 12, 5, 33, 49}, {12, 5, 25, 11, 6, 20, 62}, {12, 7, 22, 11, 7, 13, 69}, {12, 9, 19, 11, 7, 8, 74}, {12, 10, 19, 10, 8, 7, 74}, {10, 9, 16, 12, 6, 67, 20}, {11, 6, 20, 13, 5, 46, 41}, {11, 5, 21, 12, 7, 26, 59}, {11, 7, 19, 12, 9, 14, 70}, {11, 8, 18, 11, 10, 8, 75}, {11, 9, 16, 11, 10, 5, 78}, {12, 10, 15, 11, 10, 4, 80}, {11, 10, 15, 10, 10, 4, 78}, {11, 9, 15, 12, 8, 34, 54}, {11, 7, 17, 11, 10, 16, 69}, {11, 7, 17, 11, 11, 7, 76}, {11, 8, 16, 11, 11, 4, 80}, {10, 10, 14, 11, 11, 3, 81}, {11, 10, 13, 11, 12, 2, 82}, {11, 10, 13, 11, 12, 2, 82}, {11, 11, 13, 10, 12, 3, 80}, {11, 9, 14, 11, 11, 8, 77}, {11, 8, 14, 11, 12, 3, 81}, {11, 9, 14, 11, 12, 1, 83}, {10, 10, 13, 11, 12, 2, 83}, {10, 11, 12, 11, 12, 2, 82}, {10, 11, 12, 11, 12, 3, 82}, {11, 11, 11, 11, 12, 3, 81}, {11, 11, 11, 11, 13, 5, 79}, {11, 10, 13, 11, 13, 2, 82}, {11, 9, 13, 11, 13, 1, 83}, {11, 10, 12, 11, 13, 2, 82}, {10, 11, 12, 11, 12, 3, 81}, {10, 11, 12, 11, 12, 4, 80}, {10, 11, 11, 11, 12, 5, 80}, {11, 11, 11, 11, 13, 5, 79}, {11, 11, 11, 11, 12, 6, 77}}.

After the above parameters (i.e. mWeight, sW, and fO) are obtained from the mapping tables, the above parameters and the prediction input value set are input into equations (1) and (2), to obtain the prediction values of the samples at the specific positions in the current block.

In order to obtain the MIP matrix of the current block, the bit right shift parameter of the current block, and the weighting parameter of the current block, in some implementations, the MIP matrix of the current block, the bit right shift parameter of the current block, and the weighting parameter of the current block are determined from the one or more pre-stored mapping tables as follows. The MIP matrix of the current block, the bit right shift parameter of the current block, and the weighting parameter of the current block are determined from the one or more pre-stored mapping tables according to the size of the current block.

In other words, according to the size of the current block, the MIP matrix of the current block, the bit right shift parameter of the current block, and the weighting parameter of the current block corresponding to the size of the current block are obtained from the mapping table. For example, when the size of the current block is 4×4, MipSizeId=0; when the size of the current block is 4×8, 8×4, or 8×8, MipSizeID=1; and when the size of the current block is larger than 8×8, MipSizeID=2. According to the value of MipSizeID, the MIP matrix of the current block and the bit right shift parameter of the current block corresponding to the size of the current block can be found from the mapping table.

At block S507, the prediction values of the samples at the specific positions are filtered to obtain prediction values of all samples in the current block.

After the prediction values of the samples at the specific positions are determined at block S506, the prediction values of the samples at the specific positions can be filtered to obtain the prediction values of all samples in the current block.

In order to obtain the prediction values of all samples in the current block, in some implementations, operations at block S507 can include the following. Interpolation filtering is performed on the prediction values of the samples at the specific positions to obtain prediction values of samples at other positions in the current block other than the samples at the specific positions.

Here, by performing interpolation filtering on the prediction values of the samples at the specific positions, the prediction values of samples at other positions in the current block other than the samples at the specific positions can be obtained, and thus the prediction values of all samples in the current block can be obtained.

In other words, compared with equations (1)~(5) in the conventional prediction method, in the prediction method performed by the encoder based on MIP technology provided herein, calculation of p[0] in equation (7) is reversed relative to equation (3). As such, all p[x] values in equation (3) and all p[x] values in equation (7) can be in a uniform form, that is, pTemp[0] is subtracted in both equation (3) and equation (7). Mean compensation in equation (1) directly uses pTemp[0], such that a coefficient of pTemp[0] in the calculation equation of predMip[x][y] (that is, equation (1)) is unified as follows:

$$1-(m\text{Weight}[x][0]-fO)\gg sW = 1-m\text{Weight}_f[x][0] \qquad (9)$$

A coefficient in the traditional prediction method is as follows:
when y=0:

$$1-(m\text{Weight}[x][0]-fO)\gg sW = 1+m\text{Weight}_f[x][0] \qquad (10)$$

in other cases:

$$1-(m\text{Weight}[x][0]-fO)\gg sW = 1-m\text{Weight}_f[x][0] \qquad (11)$$

Considering the nature of a filter in MIP, the value of the coefficient is likely to be in the range of −1~1. Therefore, by unifying the coefficient to be 1−mWeight$_f$[x][0], the value of mWeight$_f$[x][0] tends to be a positive value, and an overall variation range tends to be smaller.

Based on this, values of a first column of parameters of an MIP matrix mWeight$_f$ obtained through training become those obtained by reversing values of a first column of parameters of an original MIP matrix mWeight$_f$. In this way, a value range of parameters in the whole MIP matrix mWeight$_f$ will be reduced compared with that in the original MIP matrix mWeight$_f$, which is conducive to a higher representation precision, thereby improving representation precision.

In the original MIP matrix mWeight$_f$, as to changes in a value range of a first column of data that have been reversed, as an example, a first column of each of 28 original floating-point number matrices shown in Table 1, of which MipSizeID is 0 or 1, is reversed, and a value range thus obtained will remain unchanged or be reduced. As shown in Table 2 below, value ranges of 11 of the 28 matrices are reduced, and value ranges of the remaining 17 matrices remain unchanged. Among the 11 matrices with a reduced value range, there are 4 matrices that can improve representation precision of the currently known weights obtained through training.

TABLE 2

|  | Matrices with a reduced value range after being reversed | Matrices with a reduced value range and an increased sW value after being reversed |
|---|---|---|
| MipSizeId = 0 | modeId = 1, 3, 5, 6, 8, 10, 11, 14, 15, 17 | modeId = 3, 5, 8, 17 |
| MipSizeId = 1 | modeId = 3 | None |

As can be seen, Table 2 shows matrix ID of matrices with a reduced value range after being reversed and matrices with a reduced value range and an increased sW value after being reversed, where MipSizeID=0 or 1.

Tables 3~5 below are specific examples. Each table is divided into two parts (a left part and a right part). In each of Table 3 and Table 5, the left part represents mWeight$_f$ and the right part represents mWeight$_f$. In Table 4, the left part represents mWeight$_f$, and the right part represents mWeight. In each of Table 3 and Table 5, a first column shows values of mWeight$_f$[x][0], and a first column of the right part shows values of reversed mWeight$_f$[x][0].

Tables 3 and 4 show changes under a same MIP mode after the technical solutions of implementations are adopted. A value range of mWeight$_f$[x][0] becomes smaller after being reversed, and the sW value changes from 5 to 6. Each value of mWeight[x][y] obtained according to equation (6) is not greater than 127, which falls in a valid value range represented by 7 bits. Table 5 shows an example in which a value range of mWeight$_f$[x][0] remains unchanged after being reversed.

Table 3 shows an example in which a first column of an original floating-point number matrix, of which MipSizeID=0 and modeId=3, is reversed (the left part shows original values and the right part shows reversed values).

TABLE 4

| Value range | 1.906 | | | | Value range | 122 | | |
|---|---|---|---|---|---|---|---|---|
| 0 | 0 | 0.344 | 0.031 | | 32 | 32 | 54 | 34 |
| 0 | 0.094 | 0.031 | 0.031 | | 32 | 38 | 34 | 34 |
| 0 | 0.969 | 0.094 | −0.03 | | 32 | 94 | 38 | 30 |
| 0.031 | 1.219 | 0.125 | −0.06 | | 34 | 110 | 40 | 28 |
| 0 | −0.03 | 0.75 | 0 | | 32 | 30 | 80 | 32 |
| 0 | 0.313 | 0.375 | −0.03 | | 32 | 52 | 56 | 30 |
| 0.031 | 1.156 | 0.25 | −0.03 | | 34 | 106 | 48 | 30 |
| 0.188 | 1.125 | 0.094 | 0.125 | | 44 | 104 | 38 | 40 |
| 0 | −0.03 | 0.375 | 0.625 | | 32 | 30 | 56 | 72 |
| 0.25 | 0.5 | 0.094 | 0.75 | | 48 | 64 | 38 | 80 |
| 0.563 | 0.906 | −0.19 | 0.844 | | 68 | 90 | 20 | 86 |
| 0.688 | 0.719 | −0.38 | 0.906 | | 76 | 78 | 8 | 90 |
| 0.281 | 0 | −0.5 | 1.406 | | 50 | 32 | 0 | 122 |
| 0.688 | 0.563 | −0.44 | 1.156 | | 76 | 68 | 4 | 106 |
| 0.844 | 0.656 | −0.38 | 1 | | 86 | 74 | 8 | 96 |
| 0.781 | 0.656 | −0.38 | 0.969 | | 82 | 74 | 8 | 94 |

Table 4 shows a matrix of which MipSizeID=0 and modeId=3. By adopting the technical solutions herein, the bits of the right shift is sW=6 without lying beyond a value range represented by 7 bits.

TABLE 5

| Value range | 2.22 | | | | Value range | 2.22 | | |
|---|---|---|---|---|---|---|---|---|
| 0.03 | −0 | 0.94 | 0.03 | | −0 | −0 | 0.94 | 0.03 |
| 0 | 0.03 | 0.94 | 0.03 | | 0 | 0.03 | 0.94 | 0.03 |
| 0 | 0.25 | 0.91 | 0.03 | | 0 | 0.25 | 0.91 | 0.03 |
| 0 | 0.34 | 0.84 | 0.03 | | 0 | 0.34 | 0.84 | 0.03 |
| 0 | 0.06 | 1 | 0.03 | | 0 | 0.06 | 1 | 0.03 |
| 0 | 0.09 | 1 | 0.03 | | 0 | 0.09 | 1 | 0.03 |
| 0 | 0.06 | 1 | 0.03 | | 0 | 0.06 | 1 | 0.03 |
| 0 | 0.09 | 1 | 0.03 | | 0 | 0.09 | 1 | 0.03 |
| 0.09 | 0.09 | 0.81 | 0.22 | | −0.1 | 0.09 | 0.81 | 0.22 |
| 0.09 | 0.09 | 0.84 | 0.19 | | −0.1 | 0.09 | 0.84 | 0.19 |
| 0.06 | 0.13 | 0.84 | 0.16 | | −0.1 | 0.13 | 0.84 | 0.16 |
| 0.03 | 0.13 | 0.84 | 0.16 | | −0 | 0.13 | 0.84 | 0.16 |
| −0.3 | −0.2 | −0.7 | 1.56 | | 0.28 | 0.2 | −0.7 | 1.56 |
| −0.4 | −0.2 | −0.6 | 1.44 | | 0.44 | 0.2 | −0.6 | 1.44 |
| −0.5 | −0.2 | −0.6 | 1.34 | | 0.53 | 0.2 | −0.6 | 1.34 |
| −0.5 | −0.3 | −0.5 | 1.31 | | 0.53 | 0.3 | −0.5 | 1.31 |

TABLE 3

| Value range | 2.25 | | | | Value range | 1.9063 | | |
|---|---|---|---|---|---|---|---|---|
| 0 | 0 | 0.3438 | 0.0313 | | 0 | 0 | 0.3438 | 0.0313 |
| 0 | 0.0938 | 0.0313 | 0.0313 | | 0 | 0.0938 | 0.0313 | 0.0313 |
| 0 | 0.9688 | 0.0938 | −0.031 | | 0 | 0.9688 | 0.0938 | −0.031 |
| −0.031 | 1.2188 | 0.125 | −0.063 | | 0.0313 | 1.2188 | 0.125 | −0.063 |
| 0 | −0.031 | 0.75 | 0 | | 0 | −0.031 | 0.75 | 0 |
| 0 | 0.3125 | 0.375 | −0.031 | | 0 | 0.3125 | 0.375 | −0.031 |
| −0.031 | 1.1563 | 0.25 | −0.031 | | 00313 | 1.1563 | 0.25 | −0.031 |
| −0.188 | 1.125 | 0.0938 | 0.125 | | 0.1875 | 1.125 | 0.0938 | 0.125 |
| 0 | −0.031 | 0.375 | 0.625 | | 0 | −0.031 | 0.375 | 0.625 |
| −0.25 | 0.5 | 0.0938 | 0.75 | | 0.25 | 0.5 | 0.0938 | 0.75 |
| 00.563 | 0.9063 | −0.188 | 0.8438 | | 0.5625 | 0.9063 | −0.188 | 0.8438 |
| −0.688 | 0.7188 | −0.375 | 0.9063 | | 0.6875 | 0.7188 | −0.375 | 0.9063 |
| −0.281 | 0 | −0.5 | 1.4063 | | 0.2813 | 0 | −0.5 | 1.4063 |
| −0.688 | 0.5625 | −0.438 | 1.1563 | | 0.6875 | 0.5625 | −0.438 | 1.1563 |
| −0.844 | 0.6563 | −0.375 | 1 | | 0.8438 | 0.6563 | −0.375 | 1 |
| −0.781 | 0.6563 | −0.375 | 0.9688 | | 0.7813 | 0.6863 | −0.375 | 0.9688 |

Table 5 shows reversing of a first column of an original floating-point number matrix of which MipSizeID=0 and modeId=16 (the left part shows original values and the right part shows reversed values).

As can be seen from examples of Tables 3~5 above, the method for determining a prediction value provided herein can reduce a value range of a floating-point number matrix obtained through MIP training, which is possible to improve precision in fixed-point processing, thereby improving prediction precision and improving encoding efficiency.

Implementations provide a method for determining a prediction value. The method is applicable to an encoder. According to implementations herein, the first constant is calculated, the difference between the first constant value and the first reference value in the reference value set is determined as the first prediction input value of the prediction input value set, and the prediction input value set is used for calculating prediction values of the current block. As such, it is possible to reduce effectively a dynamic value range of the prediction input value set in prediction in an MIP mode. Therefore, compared with the related art, under the same number of bits used for representing the prediction input value set and the MIP matrix, data in a dynamic range can be represented more precisely by adopting the technical solutions of implementations, which is conducive to a higher precision during calculation of a prediction value in an MIP mode, thereby improving encoding efficiency.

Figure 6:
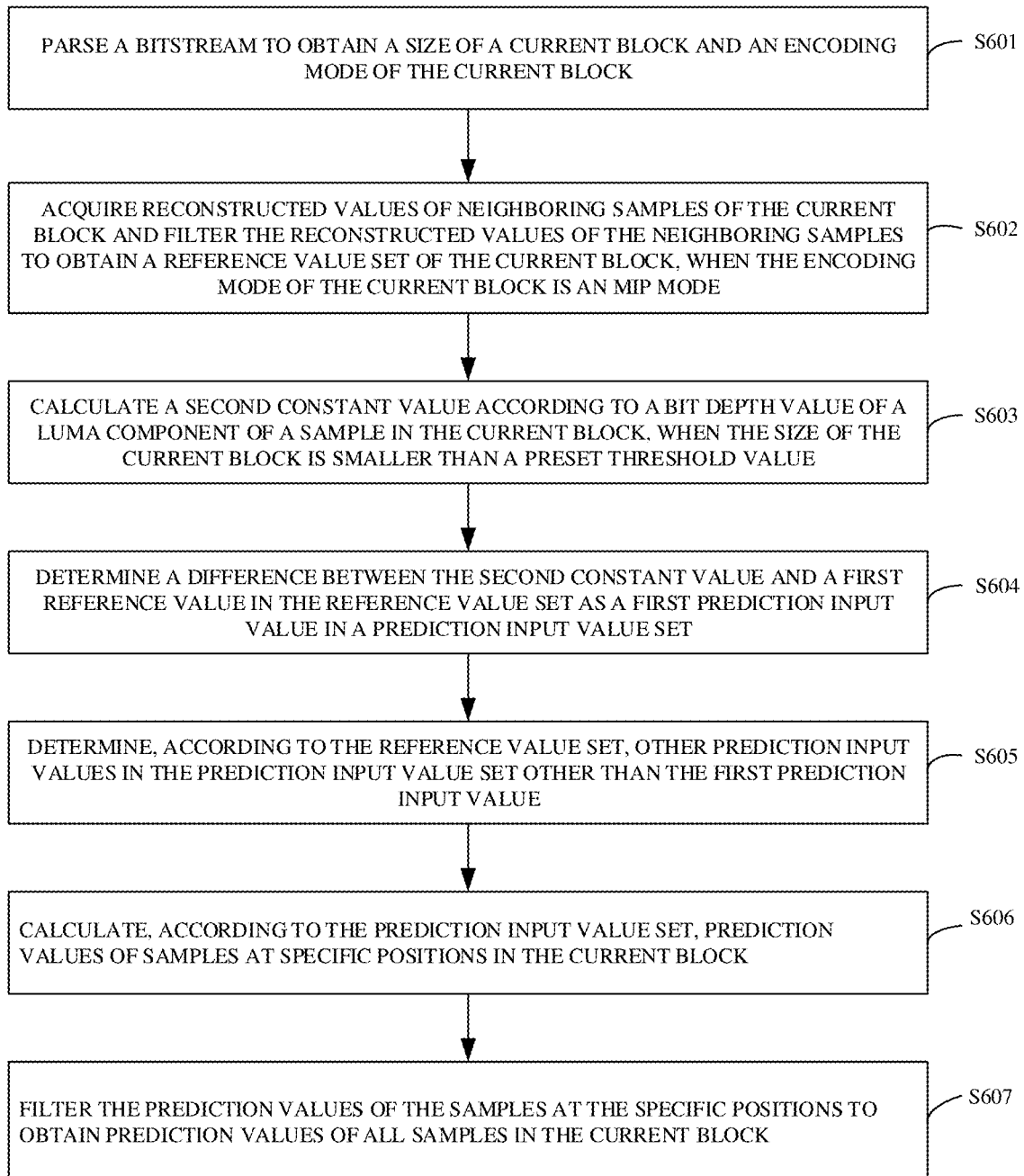
FIG. 6 is a schematic flowchart of a method for determining a prediction value according to other implementations.

In order to improve prediction precision of the MIP mode and thus improving encoding efficiency, implementations provide a method for determining a prediction value. FIG. 6 is a schematic flowchart of a method for determining a prediction value according to other implementations. As illustrated in FIG. 6, the method is applicable to a decoder. The method includes the following.

At block S601, a bitstream is parsed to obtain a size of a current block and a coding mode of the current block.

The decoder, upon receiving the bitstream, first parses the bitstream to obtain the size of the current block and the coding mode of the current block. The coding mode may be one of traditional intra prediction modes, or may be one of MIP modes. Here, the coding mode mainly refers to one of MIP modes.

At block S602, when the coding mode of the current block is an MIP mode, reconstructed values of neighboring samples of the current block are acquired and the reconstructed values of the neighboring samples are filtered to obtain a reference value set of the current block.

For example, the size of the current block may be 4×4, 4×8, 8×4, or 8×8. When the size of the current block is 4×4, the coding mode is one of coding modes of which M=35. When the size of the current block is 4×8, 8×4, or 8×8, the coding mode is one of coding modes of which M=19. When the current block is in other sizes, the coding mode is one of coding modes of which M=11.

In other words, when the coding mode of the current block is an MIP mode, the decoder first acquires the reconstructed values of the neighboring samples of the current block, where the reconstructed values of the neighboring samples of the current block include reconstructed values of samples on the top of the current block and reconstructed values of samples at the left side of the current block.

After the reconstructed values of the neighboring samples are acquired, for example, the acquired reconstructed values of samples on the top of the current block constitute redT (including N values), and the acquired reconstructed values of samples at the left side of the current block constitute redL (including N values), redT and redL constitute a new vector pTemp as the reference value set of the current block.

In order to filter to obtain the reference value set of the current block, in some implementations, the reconstructed values of the neighboring samples are filtered to obtain the reference value set of the current block at block S602 as follows. The reconstructed values of the neighboring samples are divided into N groups. For each of the N groups, an average value of reconstructed values in the group is calculated. The average value is assigned as a reference value in the reference value set, where N is a positive integer.

In some implementations, N is a positive integer value which is set in advance and corresponds to the size of the current block.

In other words, the reconstructed values of the neighboring samples are filtered at block S602 as follows. redT and redL are divided into N groups, an average value of reconstructed values in each group is calculated to obtain N average values, and the N average values are assigned as reference values in the reference value set.

For example, when the size of the current block is 4×4, inSize=4; when the size of the current block is 4×8, 8×4, or 8×8, inSize=8; and when the size of the current block is larger than 8×8, inSize=7.

At block S603, when the size of the current block smaller than a preset threshold value, a second constant value is calculated according to a bit depth value of a luma component of a sample in the current block.

In practice, when the size of the current block is represented by MipSizeID, on condition that MipSizeID is less than 2, that is, MipSizeID is equal to 0 or 1, the second constant value is calculated according to the bit depth value of the luma component of the sample in the current block.

In order to calculate the second constant value, in some implementations, the second constant value is calculated according to the bit depth value of the luma component of the sample in the current block at block S603 as follows. the second constant value is set to be a value obtained through a binary bit left shift operation on numerical value 1, where the number of shift bits in the binary bit left shift operation is equal to the bit depth value minus one.

The second constant value is a value obtained through a bit left shift operation on numerical value 1, and the bits of the left shift is equal to bit depth minus one.

At block S604, a difference between the second constant value and a first reference value in the reference value set is determined as a first prediction input value in a prediction input value set.

The prediction input value set is used for calculating a prediction value of the current block according to MIP.

After the second constant is obtained, in operations at block S604, the difference between the second constant value and the first reference value in the reference value set can be determined as the first prediction input value. The first prediction input value can be obtained by calculating equation (7) above.

At block S605, other prediction input values in the prediction input value set other than the first prediction input value are determined according to the reference value set.

Other prediction input values p[i] include prediction input values other than the first prediction input value when the size of the current block is smaller than the preset threshold value. Other prediction input values p[i] can further include prediction input values when the size of the current block is larger than or equal to the preset threshold value. Other prediction input values p[i] can be obtained by calculating equation (8) above.

At block S606, prediction values of samples at specific positions in the current block are calculated according to the prediction input value set.

After all prediction input values are determined, the prediction input value set can be obtained. Prediction can be performed according to the prediction input value set, to obtain the prediction values of the samples at the specific positions in the current block, for example, prediction values of samples at positions identified by cross lines in FIG. 3.

In order to determine the prediction values of the samples at the specific positions in the current block, in some implementations, operations at block S606 include the following. An MIP matrix of the current block, a bit right shift parameter of the current block, and a weighting parameter of the current block are determined from one or more pre-stored mapping tables. The prediction values of the samples at the specific positions in the current block are calculated according to the prediction input value set, the MIP matrix of the current block, the bit right shift parameter of the current block, and the weighting parameter of the current block.

In other words, one or more mapping tables are pre-stored in the decoder. According to the one or more mapping tables, the MIP matrix of the current block (mWeight), the bit right shift parameter of the current block (sW), and the weighting parameter of the current block (fO) can be determined.

After the above parameters (i.e. mWeight, sW, and fO) are obtained from the mapping tables, the above parameters and the prediction input value set are input into equations (1) and (2), to obtain the prediction values of the samples at the specific positions in the current block.

In order to obtain the MIP matrix of the current block, the bit right shift parameter of the current block, and the weighting parameter of the current block, in some implementations, the MIP matrix of the current block, the bit right shift parameter of the current block, and the weighting parameter of the current block are determined from the one or more pre-stored mapping tables as follows. The MIP matrix of the current block, the bit right shift parameter of the current block, and the weighting parameter of the current block are determined from the one or more pre-stored mapping tables according to the size of the current block.

In other words, according to the size of the current block, the MIP matrix of the current block, the bit right shift parameter of the current block, and the weighting parameter of the current block corresponding to the size of the current block are obtained from the mapping table. For example, when the size of the current block is 4×4, MipSizeId=0; when the size of the current block is 4×8, 8×4, or 8×8, MipSizeID=1; and when the size of the current block is larger than 8×8, MipSizeID=2. According to the value of MipSizeID, the MIP matrix of the current block and the bit right shift parameter of the current block corresponding to the size of the current block can be found from the mapping table.

At block S607, the prediction values of the samples at the specific positions are filtered to obtain prediction values of all samples in the current block.

After the prediction values of the samples at the specific positions are determined at block S606, the prediction values of the samples at the specific positions can be filtered to obtain prediction values of all samples in the current block.

In order to obtain the prediction values of all samples in the current block, in some implementations, operations at block S607 can include the following. Interpolation filtering is performed on the prediction values of the samples at the specific positions to obtain the prediction values of samples at other positions in the current block other than the samples at the specific positions.

Here, by performing interpolation filtering on the prediction values of the samples at the specific positions, the prediction values of samples at other positions in the current block other than the samples at the specific positions can be obtained, and thus the prediction values of all samples in the current block can be obtained.

Implementations provide a method for determining a prediction value. The method is applicable to a decoder. According to implementations herein, the second constant is calculated, the difference between the second constant value and the first reference value in the reference value set is determined as the first prediction input value of the prediction input value set, and the prediction input value set is used for calculating prediction values of the current block. As such, it is possible to reduce effectively a dynamic value range of the prediction input value set in prediction in an MIP mode. Therefore, compared with the related art, under the same number of bits used for representing the prediction input value set and the MIP matrix, data in a dynamic range can be represented more precisely by adopting the technical solutions of implementations, which is conducive to a higher precision during calculation of a prediction value in an MIP mode, thereby improving encoding efficiency.

Implementation 2

Based on the same conception, implementations provide an encoder. FIG. 7 is a schematic structural diagram of an encoder according to implementations. As illustrated in FIG. 7, the encoder includes a first acquiring module 71, a first processing module 72, a first calculating module 73, a first determining module 74, a second calculating module 75, a third calculating module 76, and a second processing module 77. The first acquiring module 71 is configured to acquire reconstructed values of neighboring samples of a current block. The first processing module 72 is configured to filter the reconstructed values of the neighboring samples to obtain a reference value set of the current block. The first calculating module 73 is configured to calculate a first constant value according to a bit depth value of a luma component of a sample in the current block, when a size of the current block is smaller than a preset threshold value. The first determining module 74 is configured to determine a difference between the first constant value and a first reference value in the reference value set as a first prediction input value in a prediction input value set. The second calculating module 75 is configured to determine, according to the reference value set, other prediction input values in the prediction input value set other than the first prediction input value. The third calculating module 76 is configured to calculate, according to the prediction input value set, prediction values of samples at specific positions in the current block. The second processing module 77 is configured to filter the prediction values of the samples at the specific positions to obtain prediction values of all samples in the current block.

In some implementations, the first processing module 72 is configured to operate as follows. The first processing module 72 is configured to divide the reconstructed values of the neighboring samples into N groups. The first processing module 72 is configured to, for each of the N groups, calculate an average value of reconstructed values in the group. The first processing module 72 is configured to assign the average value as a reference value in the reference value set, where N is a positive integer.

In some implementations, N is a positive integer value which is set in advance and corresponds to the size of the current block.

In some implementations, in terms of calculating the first constant value according to the bit depth value of the luma component of the sample in the current block, the first calculating module 73 is configured to set the first constant value to be a value obtained through a binary bit left shift operation on numerical value 1, where the number of shift bits in the binary bit left shift operation is equal to the bit depth value minus one.

In some implementations, the third calculating module 76 is configured to operate as follows. The third calculating module 76 is configured to determine, from one or more pre-stored mapping tables, an MIP matrix of the current block, a bit right shift parameter of the current block, and a weighting parameter of the current block. The third calculating module 76 is configured to calculate, according to the prediction input value set, the MIP matrix of the current block, the bit right shift parameter of the current block, and the weighting parameter of the current block, the prediction values of the samples at the specific positions in the current block.

In some implementations, in terms of determining, from the one or more pre-stored mapping tables, the MIP matrix of the current block, the bit right shift parameter of the current block, and the weighting parameter of the current block, the third calculating module 76 is configured to determine, from the one or more pre-stored mapping tables, the MIP matrix of the current block, the bit right shift parameter of the current block, and the weighting parameter of the current block, according to the size of the current block.

In some implementations, the second processing module 77 is configured to perform interpolation filtering on the prediction values of the samples at the specific positions to obtain prediction values of samples at other positions in the current block other than the samples at the specific positions.

Implementations provide a decoder. FIG. 8 is a schematic structural diagram of a decoder according to implementations. As illustrated in FIG. 8, the decoder includes a second acquiring module 81, a third processing module 82, a fourth calculating module 83, a second determining module 84, a fifth calculating module 85, a sixth calculating module 86, and a fourth processing module 87. The second acquiring module 81 is configured to parse a bitstream to obtain a size of a current block and a coding mode of the current block. The third processing module 82 is configured to acquire reconstructed values of neighboring samples of the current block and filter the reconstructed values of the neighboring samples to obtain a reference value set of the current block, when the coding mode of the current block is an MIP mode. The fourth calculating module 83 is configured to calculate a second constant value according to a bit depth value of a luma component of a sample in the current block, when a size of the current block is smaller than a preset threshold value. The second determining module 84 is configured to determine a difference between the second constant value and a first reference value in the reference value set as a first prediction input value in a prediction input value set. The fifth calculating module 85 is configured to determine, according to the reference value set, other prediction input values in the prediction input value set other than the first prediction input value. The sixth calculating module 86 is configured to calculate, according to the prediction input value set, prediction values of samples at specific positions in the current block. The fourth processing module 87 is configured to perform interpolation filtering on the prediction values of the samples at the specific positions to obtain prediction values of samples at other positions of the current block other than the samples at the specific positions.

In some implementations, in terms of filtering the reconstructed values of the neighboring samples to obtain the reference value set of the current block, the third processing module 82 is configured to operate as follows. The third processing module 82 is configured to divide the reconstructed values of the neighboring samples into N groups. The third processing module 82 is configured to, for each of the N groups, calculate an average value of reconstructed values in the group. The third processing module 82 is configured to assign the average value as a reference value in the reference value set, where N is a positive integer.

In some implementations, N is a positive integer value which is set in advance and corresponds to the size of the current block.

In some implementations, in terms of calculating the second constant value according to the bit depth value of the luma component of a sample in the current block, the fourth calculating module 83 is configured to set the second constant value to be a value obtained through a binary bit left shift operation on numerical value 1, where the number of shift bits in the binary bit left shift operation is equal to the bit depth value minus one.

In some implementations, the sixth calculating module 85 is configured to operate as follows. The sixth calculating module 85 is configured to determine, from one or more pre-stored mapping tables, an MIP matrix of the current block, a bit right shift parameter of the current block, and a weighting parameter of the current block. The fifth calculating module 85 is configured to calculate, according to the prediction input value set, the MIP matrix of the current block, the bit right shift parameter of the current block, and the weighting parameter of the current block, the prediction values of the samples at the specific positions in the current block.

In some implementations, in terms of determining, from the one or more pre-stored mapping tables, the MIP matrix of the current block, the bit right shift parameter of the current block, and the weighting parameter of the current block, the sixth calculating module 85 is configured to determine, from the one or more pre-stored mapping tables, the MIP matrix of the current block, the bit right shift parameter of the current block, and the weighting parameter of the current block, according to the size of the current block.

In some implementations, the fourth processing module 87 is configured to perform interpolation filtering on the prediction values of the samples at the specific positions to obtain the prediction values of samples at other positions in the current block other than the samples at the specific positions.

Figure 9:
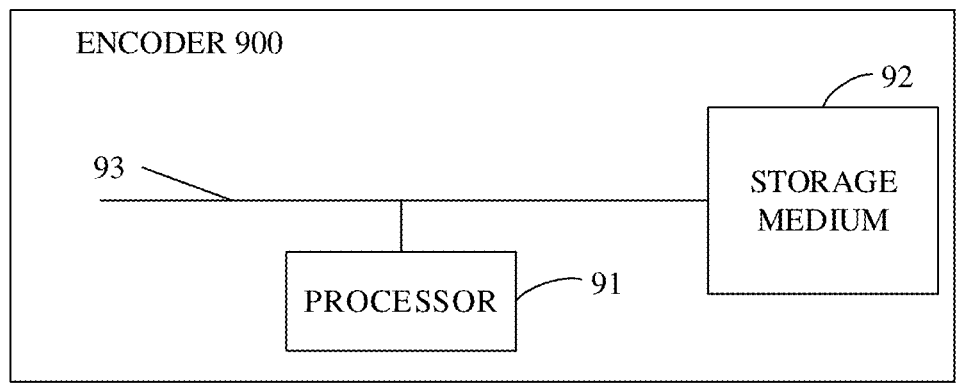
FIG. 9 is a schematic structural diagram of an encoder according to other implementations.

FIG. 9 is a schematic structural diagram of an encoder according to other implementations. As illustrated in FIG. 9, the encoder 900 includes a processor 91 and a storage medium 92 configured to store instructions executable by the processor 91. The storage medium 92 is operable with the processor 91 via a communication bus 93. The instructions, when executed by the processor 91, are operable with the processor 91 to perform the method described in one or more of the foregoing implementations.

In practice, various components of the encoder are coupled together via a communication bus 93. It can be understood that, the communication bus 93 is configured for connection and communication between these components. In addition to a data bus, the communication bus 93 further includes a power bus, a control bus, and a status signal bus. However, for clarity of description, various buses are marked as the communication bus 93 in FIG. 9.

Figure 10:
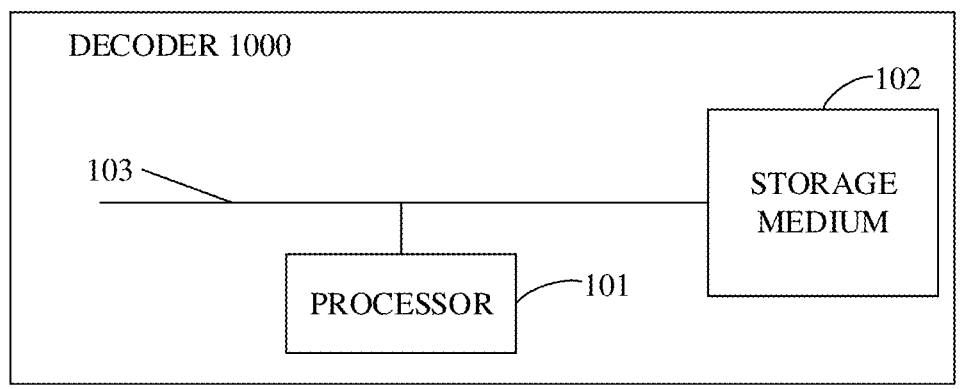
FIG. 10 is a schematic structural diagram of a decoder according to other implementations.

FIG. 10 is a schematic structural diagram of a decoder according to other implementations. As illustrated in FIG. 10, the decoder 1000 includes a processor 101 and a storage medium 102 configured to store instructions executable by the processor 101. The storage medium 102 is operable with the processor 101 via a communication bus 103. The instructions, when executed by the processor 101, are operable with the processor 101 to perform the method described in one or more of the foregoing implementations.

In practice, various components of the decoder are coupled together via a communication bus 103. It can be understood that, the communication bus 103 is configured for connection and communication between these components. In addition to a data bus, the communication bus 103 further includes a power bus, a control bus, and a status signal bus. However, for clarity of description, various buses are marked as the communication bus 103 in FIG. 10.

Implementations provide a computer storage medium. The computer storage medium is configured to store executable instructions which, when executed by one or more processors, are operable with the one or more processors to perform the method described in one or more of the foregoing implementations.

It can be understood that, the memory according to implementations may be a volatile memory or a non-volatile memory, or may include both the volatile memory and the non-volatile memory. The non-volatile memory may be a read-only memory (ROM), a programmable ROM PROM, an erasable programmable read only memory (erasable PROM, EPROM), an electrically erasable programmable read only memory (electrically EPROM, EEPROM), or a flash memory. The volatile memory can be a random access memory (RAM) that acts as an external cache. By way of explanation rather than limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link dynamic random access memory (synch-link DRAM, SLDRAM), and a direct rambus RAM (DRRAM). The memory of the systems and methods described herein is intended to include, but is not limited to, these and any other suitable types of memory.

The processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a RAM, a flash memory, a ROM, a PROM, or an electrically erasable programmable memory, registers, and the like. The storage medium is located in the memory. The processor reads the information in the memory, and completes the steps of the method described above with the hardware of the processor.

It will be appreciated that implementations described herein can be implemented in one or more of hardware, software, firmware, middleware, and microcode. For a hardware implementation, the processing unit can be implemented in one or more ASICs, DSPs, DSP devices (DSPD), programmable logic devices (PLD), FPGAs, general purpose processors, controllers, microcontrollers, microprocessors, other electronic units for performing the functions described herein or a combination thereof.

For a software implementation, the technology described herein can be implemented by modules (e.g., procedures, functions, and so on) for performing the functions described herein. The software code can be stored in the memory and executed by the processor. The memory can be implemented in the processor or external to the processor.

The terms "include", "comprise", and variations thereof are intended to cover non-exclusive inclusion, such that a process, method, object, or apparatus including a series of steps or units includes not only the listed steps or units but also other steps or units that are not listed; alternatively, other steps or units inherent to the process, method, object, or apparatus can also be included. Under the condition of no more limitations, an element defined by the statement "including a/an" does not exclude existence of the same other elements in a process, method, object, or apparatus including the element.

The sequence numbers of the foregoing implementations are adopted only for description, rather than representing superiority-inferiority of the implementations.

Based on the foregoing descriptions of the implementations, those skilled in the art may clearly understand that the method in the foregoing implementations may be implemented by software in addition to a necessary universal hardware platform or by hardware only. However, the former may be an exemplary implementation. Based on such an understanding, the essential technical solution, or the portion that contributes to the prior art may be embodied as software products. The computer software products can be stored in a storage medium (such as a ROM/RAM, a magnetic disk, or an optical disk) and may include multiple instructions that, when executed, can cause a terminal device, e.g., a mobile phone, a computer, a server, a network device, etc., to execute the methods described in various implementations.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

INDUSTRIAL APPLICABILITY

Implementations provide a method for determining a prediction value, an encoder, a decoder, and a computer storage medium. The method is applicable to an encoder. The method includes the following. Reconstructed values of neighboring samples of a current block are acquired. The reconstructed values of the neighboring samples are filtered to obtain a reference value set of the current block. When a size of the current block is smaller than a preset threshold value, a first constant value is calculated according to a bit depth value of a luma component of a sample in the current block. A difference between the first constant value and a first reference value in the reference value set is determined as a first prediction input value in a prediction input value set. Other prediction input values in the prediction input value set other than the first prediction input value are determined according to the reference value set. Prediction values of samples at specific positions in the current block are calculated according to the prediction input value set. The prediction values of the samples at the specific positions are filtered to obtain prediction values of all samples in the current block. As such, it is possible to improve prediction precision in video encoding and decoding, thereby improving efficiency in encoding and decoding.

What is claimed is:

1. A method for determining a prediction value, being applicable to an encoder and comprising:
acquiring reconstructed values of neighboring samples of a current block;
filtering the reconstructed values of the neighboring samples to obtain a reference value set of the current block;
calculating a first constant value according to a bit depth value of a luma component of a sample in the current block, when a size of the current block is smaller than a preset threshold value;
determining a difference between the first constant value and a first reference value in the reference value set as a first prediction input value in a prediction input value set;
determining, according to the reference value set, other prediction input values in the prediction input value set other than the first prediction input value;
calculating prediction values of samples at specific positions in the current block, according to the prediction input value set, a matrix-based intra prediction (MIP) matrix, a weighting parameter, and a bit right shift parameter; and
performing interpolation filtering on the prediction values of the samples at the specific positions to obtain prediction values of samples at other positions in the current block other than the samples at the specific positions.

2. The method of claim 1, wherein filtering the reconstructed values of the neighboring samples to obtain the reference value set of the current block comprises:
dividing the reconstructed values of the neighboring samples into N groups;
for each of the N groups, calculating an average value of reconstructed values in the group; and
assigning the average value as a reference value in the reference value set, wherein N is a positive integer.

3. The method of claim 2, wherein N is a positive integer value which is set in advance and corresponds to the size of the current block.

4. The method of claim 1, wherein calculating the first constant value according to the bit depth value of the luma component of the sample in the current block comprises:
setting the first constant value to be a value obtained through a binary bit left shift operation on numerical value 1, wherein a number of bits in the binary bit left shift operation is equal to the bit depth value minus one.

5. A method for determining a prediction value, being applicable to a decoder and comprising:
parsing a bitstream to obtain a size of a current block and a coding mode of the current block;
acquiring reconstructed values of neighboring samples of the current block and filtering the reconstructed values of the neighboring samples to obtain a reference value set of the current block, when the coding mode of the current block is a matrix-based intra prediction (MIP) mode;
calculating a second constant value according to a bit depth value of a luma component of a sample in the current block, when the size of the current block is smaller than a preset threshold value;
assigning a difference between the second constant value and a first reference value in the reference value set as a first prediction input value in a prediction input value set;
determining, according to the reference value set, other prediction input values in the prediction input value set other than the first prediction input value;
calculating prediction values of samples at specific positions in the current block, according to the prediction input value set, a MIP matrix, a weighting parameter, and a bit right shift parameter; and
performing interpolation filtering on the prediction values of the samples at the specific positions to obtain prediction values of samples at other positions in the current block other than the samples at the specific positions.

6. The method of claim 5, wherein filtering the reconstructed values of the neighboring samples to obtain the reference value set of the current block comprises:
dividing the reconstructed values of the neighboring samples into N groups;
for each of the N groups, calculating an average value of reconstructed values in the group; and
assigning the average value as a reference value in the reference value set, wherein N is a positive integer.

7. The method of claim 6, wherein N is a positive integer value which is set in advance and corresponds to the size of the current block.

8. The method of claim 5, wherein calculating the second constant value according to the bit depth value of the luma component of the sample in the current block comprises:
assigning a value obtained through a binary bit left shift operation on numerical value 1 as the second constant value, wherein a number of shift bits in the binary bit left shift operation is equal to the bit depth value minus one.

9. An encoder, comprising:
a processor; and
a storage medium storing instructions executable by the processor, wherein the storage medium is operable with the processor via a communication bus, and the instructions, when executed by the processor, are operable with the processor to:
acquire reconstructed values of neighboring samples of a current block;
filter the reconstructed values of the neighboring samples to obtain a reference value set of the current block;
calculate a first constant value according to a bit depth value of a luma component of a sample in the current block, when a size of the current block is smaller than a preset threshold value;

determine a difference between the first constant value and a first reference value in the reference value set as a first prediction input value in a prediction input value set;

determine, according to the reference value set, other prediction input values in the prediction input value set other than the first prediction input value;

calculate prediction values of samples at specific positions in the current block, according to the prediction input value set, a matrix-based intra prediction (MIP) matrix, a weighting parameter, and a bit right shift parameter; and perform interpolation filtering on the prediction values of the samples at the specific positions to obtain prediction values of samples at other positions in the current block other than the samples at the specific positions.

10. The encoder of claim 9, wherein the processor configured to filter the reconstructed values of the neighboring samples to obtain a reference value set of the current block is configured to:

divide the reconstructed values of the neighboring samples into N groups;

for each of the N groups, calculate an average value of reconstructed values in the group; and assign the average value as a reference value in the reference value set, wherein N is a positive integer.

11. The encoder of claim 10, wherein N is a positive integer value which is set in advance and corresponds to the size of the current block.

12. The encoder of claim 9, wherein the processor configured to calculate the first constant value according to the bit depth value of the luma component of the sample in the current block is configured to:

set the first constant value to be a value obtained through a binary bit left shift operation on numerical value 1, wherein a number of bits in the binary bit left shift operation is equal to the bit depth value minus one.

13. A decoder, comprising:

a processor; and a storage medium storing instructions executable by the processor, wherein the storage medium is operable with the processor via a communication bus, and the instructions, when executed by the processor, are operable with the processor to:

parse a bitstream to obtain a size of a current block and a coding mode of the current block;

acquire reconstructed values of neighboring samples of the current block and filter the reconstructed values of the neighboring samples to obtain a reference value set of the current block, when the coding mode of the current block is a matrix-based intra prediction (MIP) mode;

calculate a second constant value according to a bit depth value of a luma component of a sample in the current block, when the size of the current block is smaller than a preset threshold value;

assign a difference between the second constant value and a first reference value in the reference value set as a first prediction input value in a prediction input value set;

determine, according to the reference value set, other prediction input values in the prediction input value set other than the first prediction input value;

calculate prediction values of samples at specific positions in the current block, according to the prediction input value set, a MIP matrix, a weighting parameter, and a bit right shift parameter; and perform interpolation filtering on the prediction values of the samples at the specific positions to obtain prediction values of samples at other positions in the current block other than the samples at the specific positions.

14. The decoder of claim 13, wherein the processor configured to filter the reconstructed values of the neighboring samples to obtain the reference value set of the current block is configured to:

divide the reconstructed values of the neighboring samples into N groups;

for each of the N groups, calculate an average value of reconstructed values in the group; and assign the average value as a reference value in the reference value set, wherein N is a positive integer.

15. The decoder of claim 14, wherein N is a positive integer value which is set in advance and corresponds to the size of the current block.

16. The decoder of claim 13, wherein the processor configured to calculate the second constant value according to the bit depth value of the luma component of the sample in the current block is configured to:

assign a value obtained through a binary bit left shift operation on numerical value 1 as the second constant value, wherein a number of shift bits in the binary bit left shift operation is equal to the bit depth value minus one.

* * * * *